(12) United States Patent
De Souza Schwartz et al.

(10) Patent No.: US 10,389,734 B2
(45) Date of Patent: Aug. 20, 2019

(54) METHOD AND DEVICE FOR MANAGING COMMUNICATION MESSAGE VERIFICATION PROCESS IN COMMUNICATION SYSTEM CONTAINING PLURALITY OF NODES

(71) Applicant: Hitachi Solutions, Ltd., Tokyo (JP)

(72) Inventors: Ramon De Souza Schwartz, Berkshire (GB); Andrea Tomatis, Berkshire (GB)

(73) Assignee: Hitachi Solutions, Ltd., Tokyo (JP)

( * ) Notice: Subject to any disclaimer, the term of this patent is extended or adjusted under 35 U.S.C. 154(b) by 289 days.

(21) Appl. No.: 15/521,928

(22) PCT Filed: Nov. 27, 2015

(86) PCT No.: PCT/JP2015/083413
§ 371 (c)(1),
(2) Date: Apr. 26, 2017

(87) PCT Pub. No.: WO2016/088676
PCT Pub. Date: Jun. 9, 2016

(65) Prior Publication Data
US 2017/0331836 A1    Nov. 16, 2017

(30) Foreign Application Priority Data
Dec. 3, 2014   (EP) .................................... 14196093

(51) Int. Cl.
*H04W 12/12* (2009.01)
*H04L 29/06* (2006.01)
(Continued)

(52) U.S. Cl.
CPC ..... *H04L 63/123* (2013.01); *G08G 1/096791* (2013.01); *H04L 63/126* (2013.01);
(Continued)

(58) Field of Classification Search
None
See application file for complete search history.

(56) References Cited

U.S. PATENT DOCUMENTS 6,012,087 A  *   1/2000  Freivald ............... G06F 16/957
                                                      709/218

FOREIGN PATENT DOCUMENTS

| EP | 2058992 A1 | 5/2009 |
| EP | 2058992 B1 * | 4/2011 |
| WO | 2013/185997 A1 | 12/2013 |

OTHER PUBLICATIONS

Firl et al., Marv-V: Applying Maneuver Assessment for Reliable Verification or Car to X Mobility Data, Intelligent Transportation Systems, 2013, IEEE Transactions on Aug. 29, 2013, vol. 14, issue 3, pp. 1301-1312. (Year: 2013).*

(Continued)

*Primary Examiner* — Luu T Pham
*Assistant Examiner* — Edward X Long
(74) *Attorney, Agent, or Firm* — Mattingly & Malur, PC

(57) ABSTRACT

A method and device for managing a communication message verification process in a communication system containing a plurality of nodes N1 to N9, including: a step of receiving one or more communication messages at a first node N1 of the communication system, from one or more nodes N2 to N9 adjacent to the first node N1; a step of executing a validity verification operation in relation to the one or more received communication messages; a step of determining a comprehensive verification rate parameter V_all indicating the number of validity verification operations executed per unit time at the first node N1; and a step of controlling the execution of the validity verification operations so that the comprehensive verification rate parameter V_all does not exceed a comprehensive verifica- (Continued)

tion rate threshold, for one or more additional communication messages from the nodes N2 to N9 adjacent to the first node N1.

12 Claims, 11 Drawing Sheets

(51) Int. Cl.
*H04W 12/10* (2009.01)
*G08G 1/0967* (2006.01)
*H04W 84/00* (2009.01)
*H04W 12/04* (2009.01)

(52) U.S. Cl.
CPC ............ *H04W 12/10* (2013.01); *H04W 12/04* (2013.01); *H04W 12/12* (2013.01); *H04W 84/005* (2013.01)

(56) References Cited

OTHER PUBLICATIONS

Hannes Hartenstein, A Tutorial Survey on Vehicular Ad Hoc Networks, 2008, IEEE Communications Magazine, Jun. 2008, 164-171. (Year: 2008).*

Q. Zhang et al., An Improved Scheme for Key Management of RFID in Vehicular Adhoc Networks, 2013, IEEE Latin America Transactions, vol. 111, No. 6, Dec. 2013, 1286-1294. (Year: 2013).*

Elmar Schoch et al., "On the Efficiency of Secure Beaconing in VANETs" WiSec' 10, Mar. 22-24, 2010.

International Search Report of PCT/JP2015/083413 dated Jan. 19, 2016.

* cited by examiner

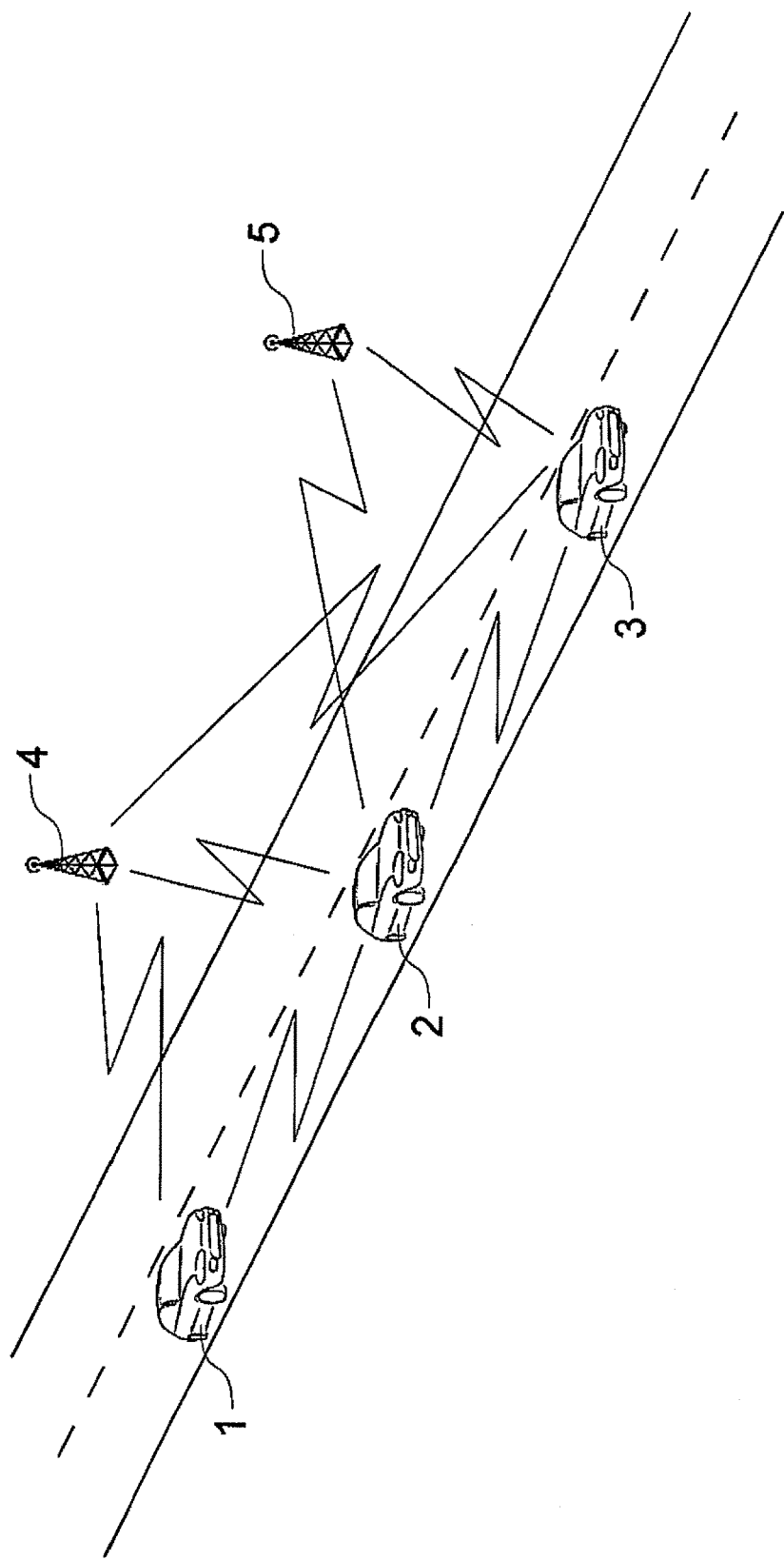

METHOD AND DEVICE FOR MANAGING COMMUNICATION MESSAGE VERIFICATION PROCESS IN COMMUNICATION SYSTEM CONTAINING PLURALITY OF NODES

TECHNICAL FIELD

The present invention relates to a method and an apparatus for managing verification processing of communication messages in a communication system including a plurality of nodes, in particular in a mobile ad-hoc network including mobile nodes and optionally further including stationary nodes.

BACKGROUND ART

Non-infrastructure network technologies, such as for example ad-hoc networks and sensor networks, are getting popular more and more. Particularly, in the field of Intelligent Transport Systems (ITS), distributed wireless communication technologies between vehicles (V2V) or between vehicles and infrastructures (V2I) have been actively discussed worldwide, for improving road safety, traffic efficiency and comfort and/or entertainment for drivers and passengers.

A Mobile Ad-hoc NETwork (MANET) is a communication network formed by a plurality of network nodes connected via wireless communications by means of radio communication means. These radio communication means may include, but are not limited to, WLAN, Bluetooth and/or Infrared interfaces. Every network node participating in a MANET is configured to act as a client, server or relay for communications established among a set of network nodes.

The topology of a MANET is generally arbitrary and even i network node can move freely and possibly also in an unpredictable manner. Generally, the size of a MANET is kept relatively small, but the number of MANET network nodes is basically unlimited and can potentially grow without any limit.

When most of the MANET nodes are vehicles or at least mounted to vehicles such as cars or the like (under the assumption that wireless radio means are installed on the vehicle), such networks are generally referred to as Vehicular MANETs, or also VANET.

Of course, some nodes of a VANET can also be stationary nodes or substantially stationary nodes such as, e.g. nodes mounted on cross-lights, nodes mounted on roadside gateways, VANET extensors or even devices carried by pedestrians (e.g. cell phones) as quasi-stationary nodes. Position services like GPS or Galileo may be used for node tracking and position related services.

The VANET node mobility is generally constrained by specific paths such as a traffic network comprising roads and traffic intersections or the like, the topology of which may be, however, digitally available e.g. via navigation data for navigation systems.

Such vehicular communication networks, in which nodes potentially have high mobility, require advanced access control, topology maintenance, and routing procedures for supporting the data communications for those services.

One of characteristic technologies in this field is a geographical-based routing/dissemination method, in which a data message or data packet is delivered based on position information of vehicles and its destination.

The basis for many vehicular communication networks applications may be represented by periodic beacons carrying information like location, heading and speed. In order to secure beaconing, messages should be signed and/or carry a certificate to attest valid network participants.

As discussed e.g. in the article "On the Efficiency of Secure Beaconing in VANETs" by E. Schoch and F. Kargl (In; Proceedings of the third ACM conference on Wireless network security, ACM WiSec 2010, Hoboken, N.J., USA; pp. 111-116), looking at recent standardization efforts and fields tests, it becomes clear that beaconing may initially be an important aspect for upcoming C2X (car-to-car or car-to-x communication) eSafety applications.

With "beaconing" one typically refers to the periodic transmission of packets/messages containing a vehicle's position and other information as a (single-hop) link-layer broadcast to all neighboring vehicles or roadside units. Implemented in an insecure way, beaconing opens opportunities for abuse. To address these problems, many security solutions suggest to use signatures based on asymmetric cryptographic mechanisms like ECDSA together with more mechanisms. The basic strategy is to equip nodes with asymmetric cryptographic key pairs and/or certificates issued by a trusted certification authority (CA).

Then all beacons get signed using the vehicle's signature key SK and receivers verify them using the verification key V K. Signature and certificate containing V K are attached to the beacon. This mechanism introduces two significant problems: First, adding signatures and/or certificates to the beacons creates a notable protocol overhead. Even when using an ECC-based solution with comparatively small overhead, signature plus certificate require at least 150 through 160 bytes, and creating and verifying signatures causes significant computational overhead. Every sent beacon needs one signature generation and up to two verifications (signature plus certificate).

Assuming a maximum neighbor number of 200 vehicles and a beaconing rate of 10 Hz, a vehicle needs to generate 10 signatures and verify 4000 signatures per second, which exceeds the capacity of typical vehicle on-board units. As cost constraints in vehicle manufacturing are high and on-board units need to be cheap, this cannot be addressed only by using more powerful hardware.

The above article seems to propose to omit verification of certificates and/or signatures, however, the methods teach to omit verification such as to still regularly and statically verify each Nth packet message received from the other nodes. The problem is that this may still lead to high processing burden in scenarios having high densities of nodes such as e.g. in traffic jams, and it may also lead to safety concerns in case the method still only verifies any Nth packet/message in low density scenarios.

EP 2058 992 A1 and WO 2013/185997 A1 relate to algorithms in which the sequence of packet/message verification is changed based on priority, but still it is taught to verify all received packets/messages.

CITATION LIST

Patent Literature

PATENT LITERATURE 1: European Patent Application Publication No. 2058992
PATENT LITERATURE 2: International Publication No. 2013/185997

SUMMARY OF THE INVENTION

Technical Problem

In view of the above, it is an object of the invention to provide a process and apparatus for controlling message verification in a communication network including mobile nodes, which provides very high security but at the same time is more cost effective and requires less computational burden in message verification.

Solution Problem

In view of the above objects, according to the present invention, there are proposed a method for managing verification processing of communication messages in a communication system including a plurality of nodes (N1 through N9) according to claim 1, an apparatus for managing verification processing of communication messages in a communication system including a plurality of nodes according to claim 14, and a computer program product for managing verification processing of communication messages in a communication system including a plurality of nodes according to claim 15. Dependent claims relate to preferred embodiments of the present invention.

According to aspects of exemplary embodiments, there may be provided a method for managing verification processing of communication messages in a communication system including a plurality of nodes.

The method may comprise: receiving, at a first node of the communication system, one or more communication messages from one or more neighbor nodes of the first node, performing validity verification operations, e.g. security verifications e.g. based on certification data and/or signature data, for the one or more received communication messages, determining an overall verification rate parameter being indicative of a number of validity verification operations performed per unit time at the first node, and/or controlling performing validity verification operations for one or more further communication messages received at the first node from neighbor nodes of the first node on the basis of a requirement that the determined overall verification rate parameter remains below an overall verification rate threshold.

According to other aspects of exemplary embodiments, there may be provided an apparatus configured for managing verification processing of communication messages in a communication system including a plurality of nodes.

The apparatus may comprise: a receiver configured to receive one or more communication messages from one or more neighbor nodes, and a processing unit (such as one or more computer processors, e.g. CPUs, and/or one or more programmable hardware circuits such as, e.g. Field Programmable Gate Arrays or FPGAs) being configured to execute: performing validity verification operations for the one or more received communication messages, determining an overall verification rate parameter being indicative of a number of validity verification operations performed per unit time at the receiver, and/or controlling performing validity verification operations for one or more further communication messages received at the receiver from the one or more neighbor nodes on the basis of a requirement that the determined overall verification rate parameter remains below an overall verification rate threshold.

The apparatus may be configured to execute one or more or all of the steps of a method as mentioned above and/or aspects of methods discussed below and/or in the further description of exemplary embodiments.

According to other aspects of exemplary embodiments, there may be provided a computer program product for managing verification processing of communication messages in a communication system including a plurality of nodes, the computer program product comprising computer-readable program instructions which, when running on or loaded into a processing unit (such as one or more computer processors, e.g. CPUs, and/or one or more programmable hardware circuits such as, e.g. Field Programmable Gate Arrays or FPGAs) at a first node of the communication system, cause the processing unit, when a receiver at the first node receives one or more communication messages from one or more neighbor nodes of the first node, to execute one or more or all of the steps of a method as mentioned above and/or aspects of methods discussed below and/or in the further description of exemplary embodiments.

In some preferred embodiments, controlling the performing of validity verification operations for one or more further communication messages may include reducing one or more node-individual verification rates when it is determined that the determined overall verification rate parameter exceeds the overall verification rate threshold (e.g. when it becomes equal to or becomes larger than the overall verification rate threshold).

In some preferred embodiments, controlling performing validity verification operations for one or more further communication messages may include increasing one or more node individual verification rates when it is determined that the determined overall verification rate parameter falls below a second verification rate threshold.

In some preferred embodiments, each node-individual verification rate may respectively be associated with a respective one of the neighbor nodes of the first node. A respective node-individual verification rate may preferably indicate or be based on a number of validity verification operations performed per unit time at the first node for communication messages received from the respective associated neighbor node.

In some preferred embodiments, the method may further comprise: receiving, at the first node, one or more first communication messages from a second node among neighbor nodes of the first node, performing a validity verification operation for the one or more received first communication messages, and/or receiving, at the first node, one or more second communication messages from the second node.

In some preferred embodiments, reducing a node-individual verification rate being associated with the second node may preferably include deciding, upon receiving one or more second communication messages from the second node at the first node, whether to perform a validity verification operation for the one or more second communication messages on the basis of validity verification results of verification of the one or more first communication messages.

It is to be noted that further aspects and embodiments may be provided in which another related method is implemented independently of above aspects, such as e.g. a method for processing communication message and/or for managing verification processing of communication messages, in a communication network system including a plurality of network nodes, the method comprising: receiving, at a first node of the communication network system, one or more first communication messages from a second node of the communication network system, performing a validity verification operation for verification of the one or more received first communication messages, receiving, at the first node, one or more second communication messages from the second node, and/or deciding whether to perform a validity verification operation for the one or more second communication messages on the basis of validity verification results of verification of the one or more first communication messages.

In some preferred embodiments, deciding whether to perform a validity verification operation for the one or more second communication messages may be performed on the basis of verification history data being associated with the second node and/or being indicative of successful validity verification results relating to communication messages received from the second node.

In some preferred embodiments, the verification history data associated with the second node may preferably include a verification parameter being indicative of a level of trustworthiness being associated with the second node.

In some preferred embodiments, the method may further comprise: determining the verification parameter for the second node on the basis of a number of consecutive successful verifications of communication messages received from the second node.

In some preferred embodiments, the verification parameter for the second node may be determined to indicate an increased level of trustworthiness of the second node for an increasing number of consecutive successful verifications of communication messages received from the second node.

In some preferred embodiments, the verification parameter for the second node may be determined to indicate a decreased level of trustworthiness of the second node if one or more validity verification operations performed on communication messages received from the second node fail.

In some preferred embodiments, a verification rate reduction factor indicating a node-individual verification rate with respect to a node-individual receiving rate being associated with the second node may be determined on the basis of the verification parameter associated with the second node. The verification rate reduction factor may be determined based on a ration between the node-individual verification rate and the node-individual receiving rate being associated with the second node, e.g. representing a node-individual target verification rate with respect to a node-individual receiving rate and/or a node-individual minimum verification rate with respect to a node-individual receiving rate associated with the second node.

In some preferred embodiments, reducing a node-individual verification rate being associated with the second node may be performed on the basis of a maximum allowed verification rate reduction amount associated with the second node and/or on the basis of a difference between the determined overall verification rate parameter and the overall verification rate threshold.

In some preferred embodiments, if the maximum allowed verification rate reduction amount associated with the second node is smaller than the difference between the determined overall verification rate parameter and the overall verification rate threshold, the node-individual verification rate being associated with the second node may be reduced by equal or less than the maximum allowed verification rate reduction amount associated with the second node.

Then, in some further preferred embodiments, the method may further comprise reducing a node-individual verification rate being associated with a third node including deciding, upon receiving one or more third communication messages from the third node at the first node, whether to perform a validity verification operation for one or more fourth communication messages on the basis of validity verification results of verification of the one or more third communication messages.

In some preferred embodiments, the maximum allowed verification rate reduction amount associated with the second node may be determined on the basis of the determined verification rate reduction factor associated with the second node and/or a message receiving rate being indicative of a number of communication messages received at the first node from the second node per unit time.

In view of the above, some embodiments propose an advantageous control of message verification in a communication network including mobile nodes, which provides very high security but at the same time is more cost effective and requires less computational burden in message verification.

BRIEF DESCRIPTION OF DRAWINGS

FIG. 1 exemplarily illustrates a schematic view of a mobile ad-hoc communication network.

DESCRIPTION OF EMBODIMENTS

Figure 2A:
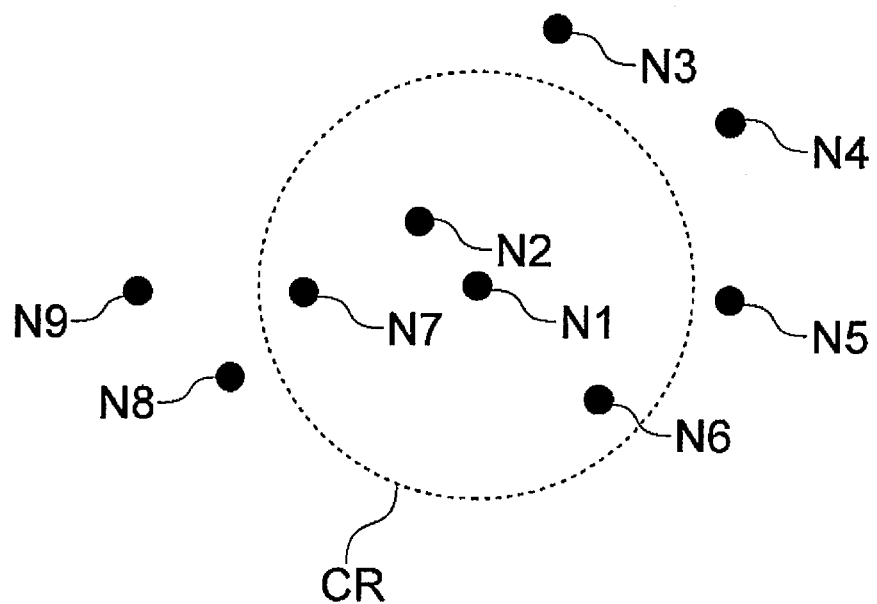
FIG. 2A exemplarily illustrates a communication situation in a mobile ad-hoc network.

Preferred exemplary embodiments will be described below with reference to the accompanying drawings. It is to be noted that the described features and aspects of the below-described embodiments may be modified or combined to form further embodiments.

In Car-to-X (C2X or C2C) communication, packets/messages received by a vehicle/node are expected to be verified by a security module. Failed verifications lead to packets/messages being dropped whereas successful verifications lead to packets/messages being accepted and processed (or sent to higher layers for processing). However, such verification process is computationally intensive and costly since it requires processors or dedicated hardware accelerator chips to handle high numbers of message verifications sometimes up to thousands of verifications per second.

Some of the exemplary embodiments aim at reducing costs, computational burden and still providing high security by defining some policies and/or criteria on deciding whether or not to verify packets/messages, preferably dynamically, preferably allowing to provide a node-individual control of the overall verification rate (typically given in units of packets/messages verified per unit time e.g. per second).

Some exemplary embodiments aim at controlling an overall verification rate by controlling one or more node-individual verification rates, in particular to maintain the overall verification rate on the basis of a target value or a threshold value (which may be pre-defined or user-adjustable, e.g. via HMI units or the like), preferably to control the overall verification rate to be dynamically kept below a threshold.

Preferred application fields of some exemplary embodiments relate to wireless vehicle-to-vehicle or vehicle-to-infrastructure communication networks such as e.g. mobile ad-hoc networks or even vehicular ad-hoc networks.

Some exemplary embodiments relate to assigning node-individual level-of-trust parameters to certain neighbor nodes, e.g. "rewarding" trustworthy nodes by increasing an associated level-of-trust parameter and "punishing" less trustworthy nodes by decreasing an associated level-of-trust parameter. For example, a node may be rewarded with an increased level-of-trust parameter when one or more, preferably successively successfully positively verified, valid messages are received, or a node may be punished with a decreased level-of-trust parameter when one or more messages are invalid and verification has a negative result (e.g. based on incorrect signatures or certificates).

In some exemplary embodiments, when, in a time in which all messages from all neighbor nodes are being verified, the overall verification rate V_all is increased to exceed a threshold, node-individual verification rates may be controlled to be reduced to decrease the overall verification rate V_all on the basis of accumulated level-of-trust parameters.

FIG. 1 exemplarily illustrates a schematic view of a mobile ad-hoc communication network, e.g. such as a vehicular communication network or vehicular ad-hoc communication network.

Exemplarily, the vehicles 1, 2 and 3 are travelling on a road of a traffic network, and are communicating with each other within the mobile ad-hoc communication network when being in each other's communication range. That is, the vehicles 1, 2 and 3 exemplarily represent communication nodes of the mobile ad-hoc communication network. For acting as communication nodes in the mobile ad-hoc communication network, the vehicles 1, 2 and 3 may be equipped with so-called On-Board Units (OBU) which are configured to communicably connect to other nodes of the communication network, e.g. in a wireless communication.

Exemplarily, the communication network further comprises the stationary nodes 4 and 5. For acting as communication nodes in the mobile ad-hoc communication network, the stationary nodes 4 and 5 may be equipped with so-called Road-Side Units (RSU) which are configured to communicably connect to other nodes of the communication network, e.g. in a wireless communication.

In the following description, it is assumed that a node of the communication network is an entity that is configured to receive and/or send messages from/to one or more other nodes of the communication network. It is to be noted that any of the nodes may be embodied as a mobile node (e.g. using an installed On-Board Unit on a vehicle or the like, or also as a mobile device such as a mobile navigation device or also a mobile phone, tablet, mobile computer or the like) or a stationary node (e.g. using a Road-Side Unit or other stationary sender/receiver configured to connect to the communication network).

Figure 2B:
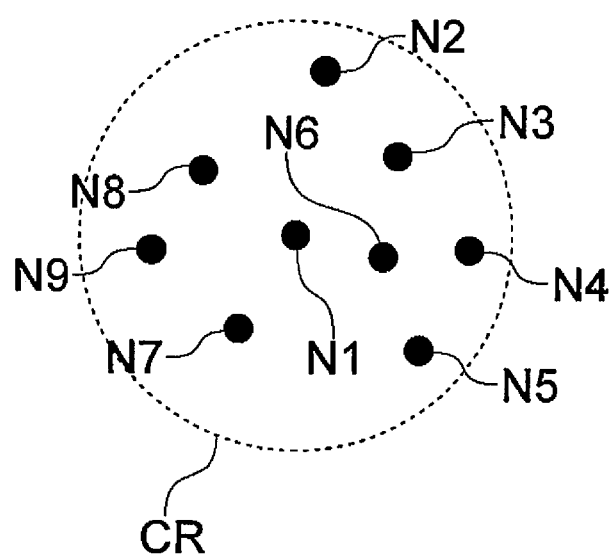
FIG. 2B exemplarily illustrates a communication situation in a mobile ad-hoc network.

FIGS. 2A and 2B exemplarily illustrate a communication situation in a mobile ad-hoc network. In FIG. 2A, the nodes N1 to N9 are shown at exemplary position with respect to each other. Each of the nodes N1 to N9 may be a mobile node or a stationary node as explained above. A communication range CR is associated with the node N1, and it is assumed that node N1 can receive messages from any nodes being located within its communication range CR, e.g. from nodes N2, N6 and N7 in FIG. 2A.

Exemplarily, the communication range CR is shown as having a circular shape in FIGS. 2A and 2B. However, it is to be noted that an actual communication range CR may also have shapes different from the circular shape e.g. because of asymmetric sensitivity of a receiving antenna or because of a topology of the environment of the node, e.g. if transmission of messages from certain directions are blocked or disturbed e.g. by buildings or other obstacles.

In FIG. 2A, the nodes N2, N6 and N7 are located in the communication range CR of node N1 and represent neighbor nodes of node N1. In general, it is assumed that neighbor nodes of a certain node are the nodes of the communication network which currently communicably connect to the respective certain node, and the certain node can receive messages from these neighbor nodes.

Since at least some of the nodes N1 to N9 may be mobile nodes moving relative to each other, the situation in the network may change so that the number of neighbor nodes of a certain nodes typically changes over time.

For example, in FIG. 2B, it is exemplarily illustrated that all nodes N2 to N9 are located in the communication range CR of the node N1, and therefore node N1 may receive messages from any of the nodes N2 to N9 in the situation of FIG. 2B and nodes N2 to N9 can be referred to as the neighbor nodes of node N1 in FIG. 2B.

In some mobile ad-hoc networks, it may be part of a protocol standard that plural or all nodes repeatedly, regularly or even periodically send messages to neighbor nodes. For example, in some protocols, there may be provided with a beaconing mechanism in which all or at least some nodes repeatedly, regularly, or even periodically (typically at beaconing frequencies of about 1 to 10 Hz) send beacon messaged to one, more or even all of its neighbor nodes, wherein each beacon message may include information on position, speed, and/or moving direction (e.g. as information on a velocity vector, or the like).

This means that depending on the number of neighbor nodes at a certain time, and the frequency of the beaconing mechanism, multiple hundreds, and multiple thousands or even up to some ten thousands of beacon messages may be received per second at the nodes, e.g. in vehicular ad-hoc networks in which lot of vehicles joining the network may be stuck in close proximity in a crowded traffic situation such as a traffic jam or higher business hour commute densities of vehicles on highways with high numbers of lanes, etc.

For example, in the situation of FIG. 2B the node N1 may receive more beacon messages per second that in the situation of FIG. 2A due to the higher number of neighbor nodes currently located within its communication range (or, in other words, due to the higher density of neighbor nodes in its vicinity).

In some mechanisms, each beacon message may further include verification information such as certification information and/or signature information for message verification purposes.

That is, the receiving node may, upon receiving a message such as e.g. a beacon message from one of its neighbor nodes, perform a verification process on the received message (e.g. for safety or security purposes) in which certification information and/or signature information included in the message is processed for determining whether the message is valid (i.e. can be verified to be valid) or not, e.g. by referring to certification information and/or signature information held at the receiving node, e.g. based on certification key information or the like.

For security reasons, it is discussed in the prior art to perform such verification process on each of the received messages (see e.g. EP 2 058 992 A1 and WO 2013/185997 A1), e.g. based on priority.

Other mechanisms have been proposed to reduce the number of total verifications in order to reduce the memory consumption and processing burden required at the node unit by only verifying the first and then each Nth message received from a certain neighbor node.

By contrast, according to some embodiments, while it is still aimed at reduce the memory consumption and processing burden in situations of large number of neighbor nodes (or lower numbers of beacon messages received), it is also aimed at providing optimal security, in particular also in situations having lower numbers of neighbor nodes (or lower numbers of beacon messages received).

So, it is proposed according to some embodiments, to dynamically control an overall verification rate at the receiving node so as to reduce the overall verification rate in situations of large number of neighbor nodes (or lower numbers of beacon messages received) and/or to increase the overall verification rate in situations having lower numbers of neighbor nodes (or lower numbers of beacon messages received).

In WO 2013/185997 A1, the priority of verification of a message may be determined e.g. upon the content of the message (e.g. data type). This may additionally lead to a problem that an attacker may aim to deceive the system in a decision of whether a message is verified.

Accordingly, in some embodiments the decision whether to verify a message or not is made independent of data type and/or data content. In particular, in some embodiments, it is advantageous to base a decision of whether to verify a message or not based on one or more previous/earlier verification result(s), in particular without considering data type and/or data content of the message.

Figure 3:
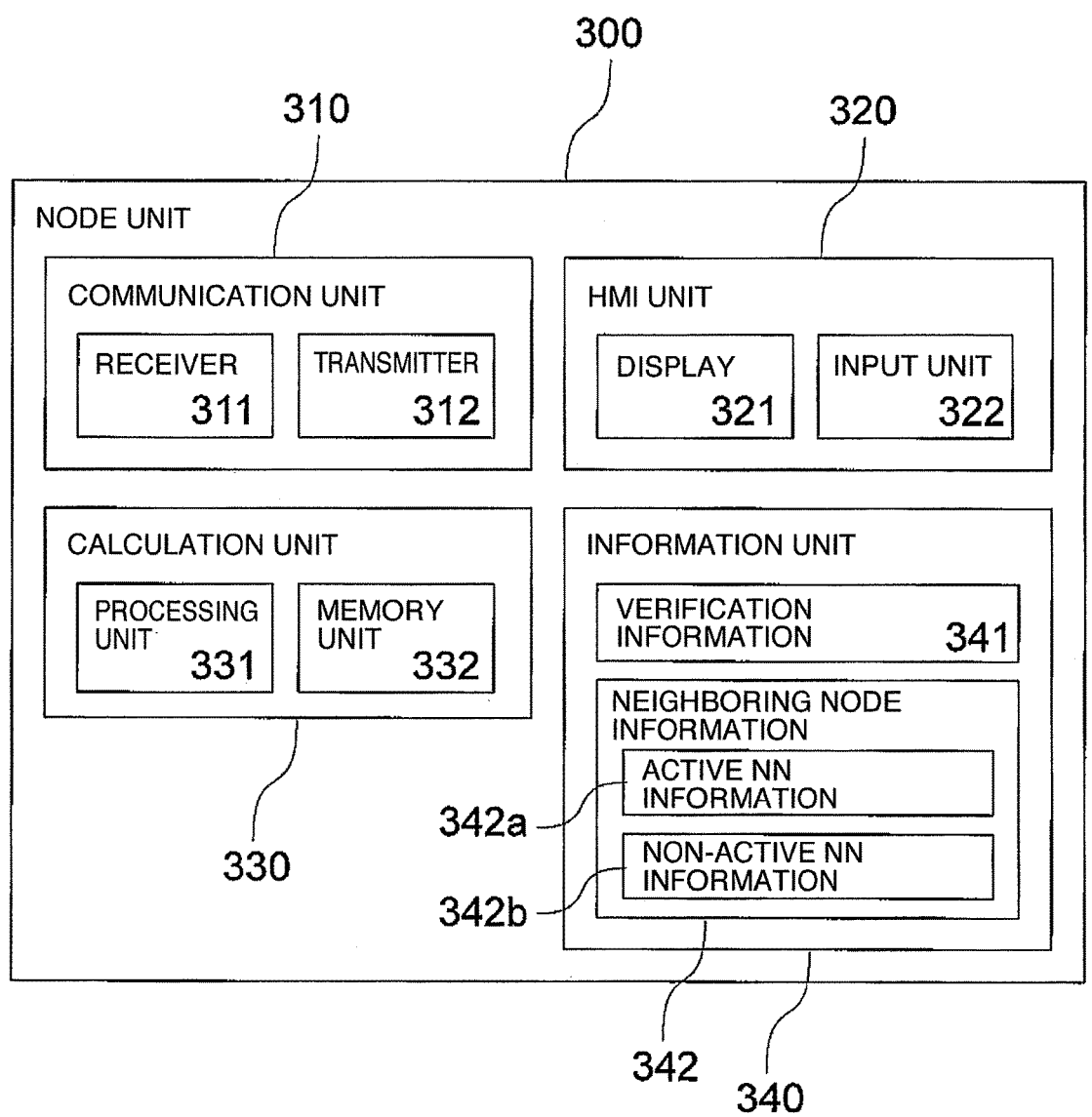
FIG. 3 exemplarily illustrates a schematic view of an exemplary architecture configuration of a node unit according to some exemplary embodiments.

FIG. 3 exemplarily illustrates a schematic view of an exemplary architecture configuration of a node unit 300 according to some exemplary embodiments.

The node unit 300 may be provided as an On-Board Unit, as part of an On-Board Unit, or attached and connected to an On-Board Unit of a mobile node of a mobile ad-hoc network, such as e.g. a vehicle in a vehicular ad-hoc network, or the node unit 300 may be provided as a stationary node, as part of a stationary node, or attached and connected to a stationary node of a mobile ad-hoc network, such as e.g. a Road-Side Unit in a vehicular ad-hoc network.

The node unit 300 comprises a communication unit 310, an HMI unit 320 (Human Machine Interface unit), a computing unit 330 and an information unit 340. The communication unit 310 exemplarily has a receiver 311 configured to receive (preferably wirelessly receive) messages from neighbor nodes in the communication network, and the communication unit 310 exemplarily has a sender 312 configured to send (preferably wirelessly send) messages to neighbor nodes in the communication network.

The communication unit may use any known wireless telecommunication technologies, including cell phone standards such as UMTS, LTE etc. and Wi-Fi, BlueTooth, or any other, including e.g. IEEE 802.11p or the like. The communication unit 310 may also include or be realized by an independent communication module such as e.g. a Telematics Control Unit (TCU).

The user may control the node unit 300 and/or may obtain information via the HMI unit 320 which exemplarily has a display 321 to indicate information to the user, and an input unit 322 configured to receive user input (such as via a touch screen, one or more buttons, one or more keypads, one or more switches and/or one or more rotation knobs/buttons).

Furthermore, the node unit 300 has the computing unit 330 which exemplarily has a processing unit 331 and a memory unit 332, wherein the memory unit 332 has data (e.g. in cache, or RAM or other memories) for being processed by the processing unit 331. The processing unit 331 may include one or more processors, such as e.g. one or more CPUs, however, in addition or alternatively, the processing unit 331 may also include programmable logical circuits such as e.g. one or more programmable logical controllers and/or one or more programmable integrated circuits such as e.g. field-programmable gate arrays (FPGAs).

The node unit 300 exemplarily has another information unit 340 (such as e.g. a memory, register, solid-state memory, or any other storage) which stores information which may be used by the computing unit 330 and/or be retrieved from the user via the HMI unit 320. Exemplarily, the information unit 340 stores verification information 341 (such as e.g. verification keys, certificates and/or signatures associated with other nodes, for verifying messages received via the receiver 311, and/or associated with the present node to add certification information and signature information to messages to be sent to other nodes via the sender 312).

Furthermore, the information unit 340 has neighbor node information 342 which indicates data on neighbor nodes. This may include information such as position, speed, direction etc. for neighbor nodes such as e.g. included in the received beaconing messages. Also, this may include various further data and parameters associated with the respective neighbor nodes, as e.g. discussed in the below embodiments.

Also, it is to be noted that the neighbor node information 342*a* may indicate the information on current neighbor nodes, e.g. all the nodes which are currently located within the communication range of the present node or the node unit 300 (e.g. active neighbor nodes). However, there may be provided also neighbor node information 342*b* which indicates information on previous neighbor nodes (e.g. inactive neighbor nodes). This may include information on former neighbor nodes which in the meantime left the communication range (and therefore are not considered current neighbor nodes anymore, but may re-enter again). In such situations, if the former neighbor nodes become current neighbor nodes again, there may be already stored useful information on them in the neighbor node information 342*b*.

Figure 4A:
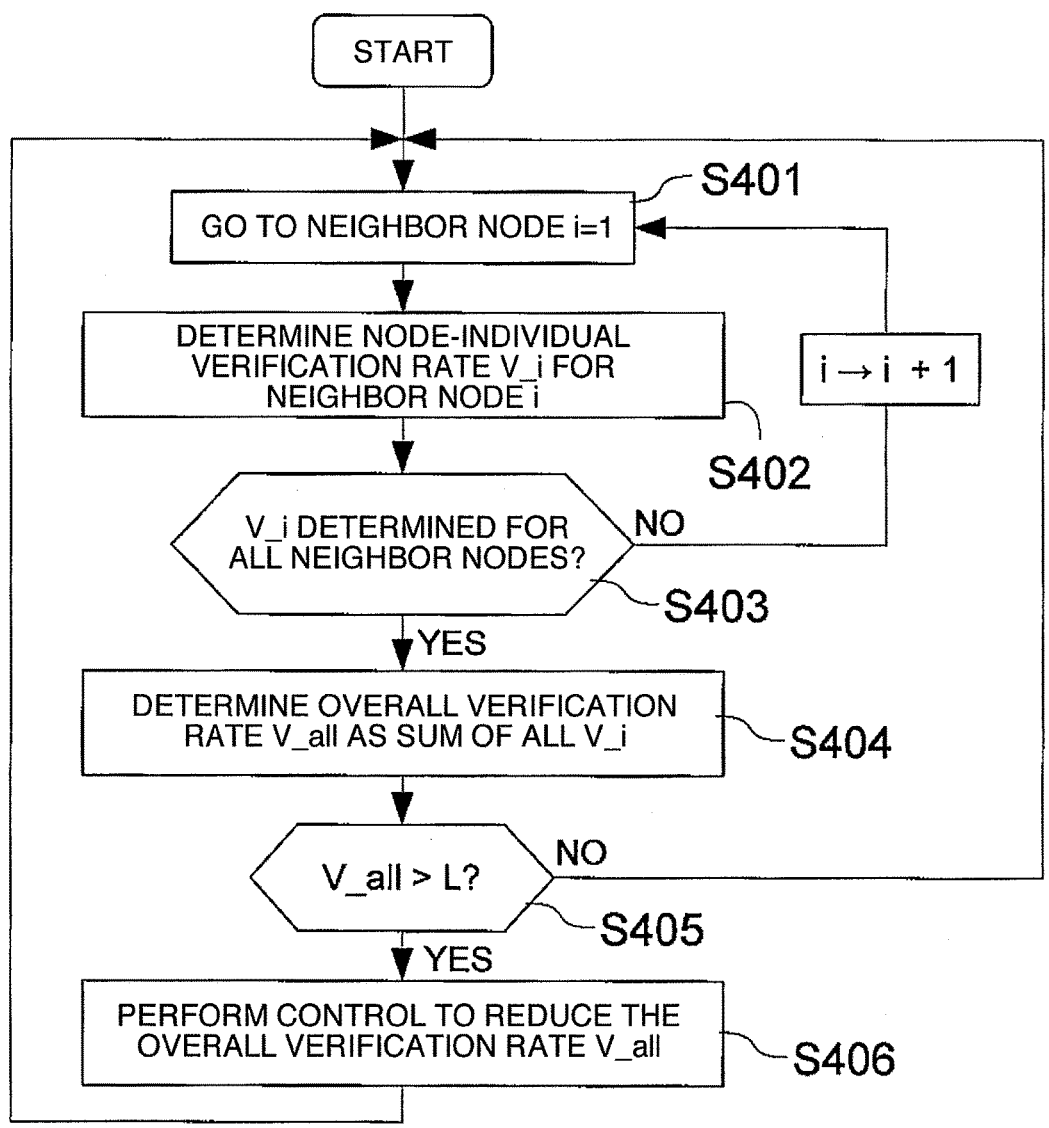
FIG. 4A exemplarily illustrates a flow chart of an exemplary verification rate control process according to some exemplary embodiments.

FIG. 4A exemplarily illustrates a flow chart of an exemplary verification rate control process according to some exemplary embodiments.

In step S401, the process as performed at a node unit at a certain node, for example, continues with the next neighbor node i among the current neighbor nodes of the certain node. This may for example be performed on neighbor node information (e.g. included in neighbor node information 342a) indicating the current neighbors such as e.g. a current neighbor list or current neighbor table. Such neighbor node information may, of course, dynamically change, as neighbor nodes may leave the communication range of the certain node, and as further nodes may become new neighbor nodes be entering the communication range of the certain node.

In step S402, the process (e.g. performed by processing unit 331 above) determines a node-individual verification rate $V\_i$ for the neighbor node i which is indicative of the number of verification operations performed for messages received from the neighbor node i per unit time. For example, the node-individual verification rate $V\_i$ for the neighbor node i may be given in the units number of verifications per second or "one per second" or Hz.

Exemplarily, here a verification operation is exemplarily used to refer to a processing step that returns a result indicating whether or not the message is valid or not. This may include checking certification information (e.g. a certificate) and/or checking signature information. Then, in such situations, this means that the node-individual verification rate $V\_i$ is exemplarily normalized with respect to the node-individual receiving rate $R\_i$ indicating a number of received messages from the neighbor node i per unit time, i.e. exemplarily the node-individual verification rate $V\_i$ would be equal to the node-individual receiving rate $R\_i$ if all received messages are verified.

In some other embodiments, this node-individual verification rate $V\_i$ may refer to a number of sub-processes (e.g. checking certification information as one step and checking signature information as a separate step).

In any case, the node-individual verification rate $V\_i$ for the neighbor node i indicates a direct or indirect measure for the processing burden involved in verification processes of messages received from the neighbor node i, i.e. the higher the node-individual verification rate $V\_i$, the higher the processing burden involved in verification processes of messages received from the neighbor node i.

In the step S403, it is determined whether the respective node-individual verification rate $V\_i$ has been determined for all current neighbor nodes, and if step S403 returns NO, the process goes to the next neighbor node i+1 to repeat step S402 for the next neighbor node i+1, until step S403 returns YES, i.e. when the respective node-individual verification rate $V\_i$ has been determined for all current neighbor nodes.

It is to be noted, that the above may be realized in some exemplary embodiments in that the process goes through a list of current neighbors to calculate the current node-individual verification rate $V\_i$ for all neighbor nodes of the list, or it may be realized in some other exemplary embodiments in that the current node-individual verification rate $V\_i$ is stored for all current neighbor nodes in neighbor node information (and e.g. continuously or periodically updated) and the above process exemplarily refers to the pre-stored (updated) node-individual verification rates $V\_i$ for the current neighbor nodes (e.g. in one or more steps).

On the basis of the node-individual verification rates $V\_i$ for the current neighbor nodes determined in step(s) S402, the process continues with step S404 to determine the current overall verification rate $V\_all$, in particular exemplarily as the sum of the determined node-individual verification rates $V\_i$ for the current neighbor nodes.

For example, if a verification operation is exemplarily used to refer to a processing step that returns a result indicating whether or not the message is valid or not, this means that the overall verification rate $V\_all$ is exemplarily normalized with respect to the overall receiving rate $R\_all$ indicating a total number of received messages per unit time, i.e. exemplarily the overall verification rate $V\_all$ would be equal to the overall receiving rate $R\_all$ if all received messages are verified.

In any case, the overall verification rate $V\_all$ indicates a direct or indirect measure for the processing burden involved in verification processes of all messages received from all of the neighbor nodes, i.e. the higher the overall verification rate $V\_all$, the higher the processing burden involved in verification processes of all messages received from all of the neighbor nodes.

In step S405, the determined overall verification rate $V\_all$ is checked against a threshold value L, e.g. by checking whether the determined overall verification rate $V\_all$ is larger than the threshold value L (overall verification rate threshold). If step S405 returns NO, i.e. if the determined overall verification rate $V\_all$ is smaller/does not exceed the threshold L, the process repeats (e.g. repeatedly, regularly, or even periodically).

On the other hand, if it is determined in step S405 that the determined overall verification rate $V\_all$ is larger than the overall verification rate threshold L (step S405 returns YES), the method continues with the step of performing control of the overall verification rate $V\_all$, in particular to control a reduction of the overall verification rate $V\_all$. In some embodiments, after step S406, the process repeats (e.g. repeatedly, regularly, or even periodically).

In some embodiments, if the current number of neighbor nodes is #NN then the node-individual verification rate $V\_i$ for each of the neighbor nodes may be reduced by an amount such as $(L-V\_all)/\#NN$ so as to dynamically control the overall verification rate $V\_all$ to not exceed the overall verification rate threshold L.

However, according to further sub-processes of other exemplary embodiments, the overall verification rate $V\_all$ may be dynamically reduced by more specifically selecting nodes for which the node-individual verification rate $V\_i$ can be reduced to reduce the overall verification rate $V\_all$.

Figure 4B:
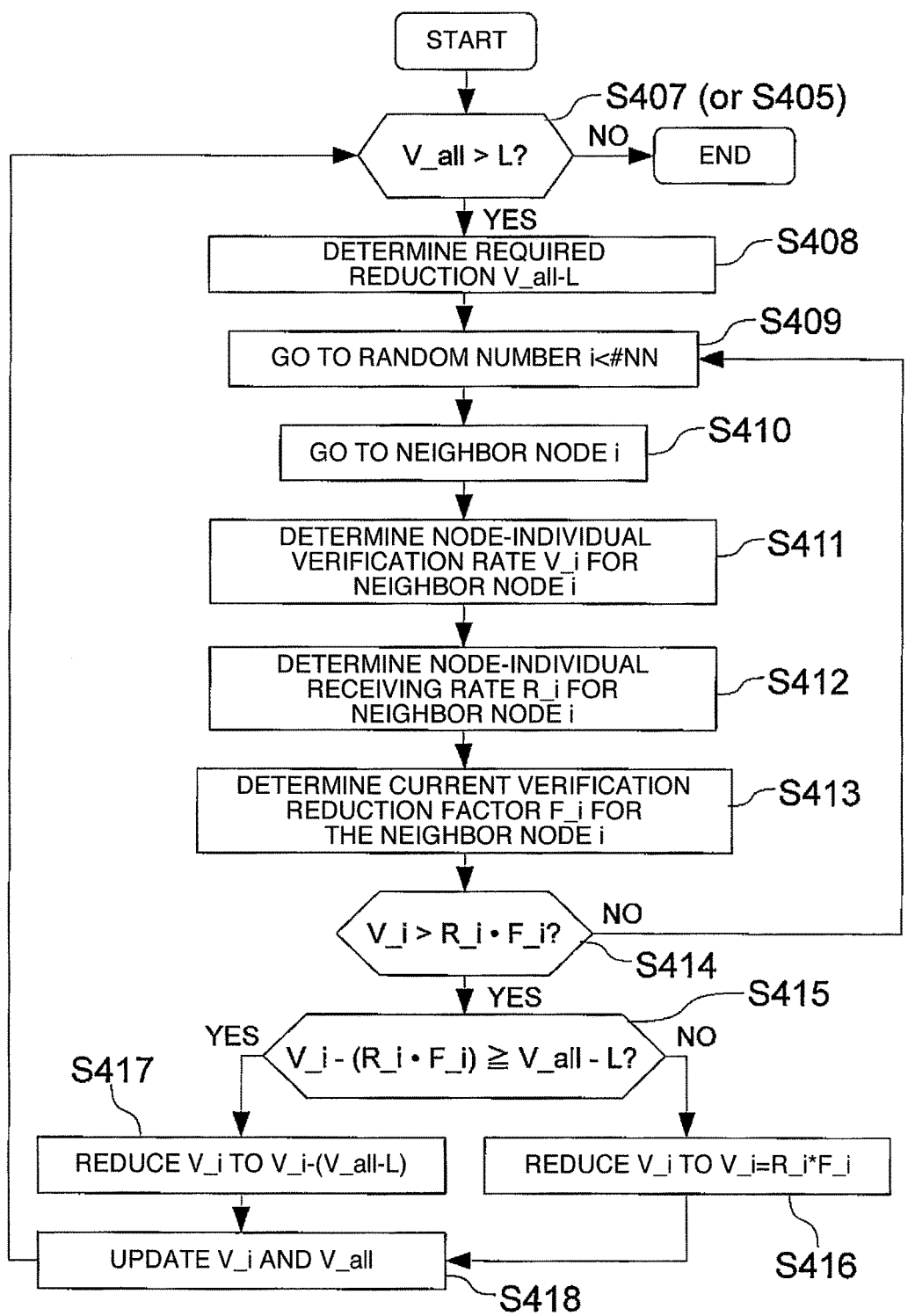
FIG. 4B exemplarily illustrates a flow chart of an exemplary verification rate control sub-process according to some exemplary embodiments.

For example, FIG. 4B exemplarily illustrates a flow chart of an exemplary verification rate control sub-process according to some exemplary embodiments, in particular for more specifically selecting nodes for which the node-individual verification rate $V\_i$ can be reduced to reduce the overall verification rate $V\_all$.

In step S407 (which may be performed already as step S405 above, or be performed again), the determined overall verification rate $V\_all$ is checked against the threshold value L, e.g. by checking whether the determined overall verification rate $V\_all$ is larger than the threshold value L (overall verification rate threshold). If step S407/S405 returns NO, the sub-process of FIG. 4B ends (or is started again with step S406 being repeated, and/or is independently started again repeatedly, regularly or even periodically).

If step S407 returns YES, the method continues with the sub-process, e.g. as part of or representing the control of step S406 or as an independent process, with step S408 in which the required reduction of the overall verification rate $V\_all$ is determined (which may be determined again as shown in FIG. 4A or be taken from updated neighbor node information), that is, calculated e.g. based on the difference between the determined overall verification rate $V\_all$ and the overall verification rate threshold L, exemplarily as required reduction amount is equal to V_all−L.

Then, for going to reduce the node-individual verification rate V_i for one of the neighbor nodes, a neighbor node needs to be selected. Of course, it is possible to just go sequentially through a list of neighbors one by one in some embodiments, or it is possible to select a most trustworthy neighbor node in other exemplary embodiments (e.g. having a large or the largest level of trust among neighbor nodes), but in preferred embodiments, for providing another layer of security against malicious nodes, the next node to be considered is selected according to a randomized process.

For example, in step S409, a random number i is selected among the numbers 1 to #NN (being the number of current neighbor nodes). Of course, other randomization processes such as a shuffle operation of a neighbor list or the like may be performed.

Based on the random number i of the step S409, the process continues with the thus randomly selected neighbor node i to determine the node-individual verification rate V_i of the randomly selected neighbor node i in step S411.

Exemplarily, the process also determines the node-individual receiving rate R_i for the randomly selected neighbor node i in step S412 and the node-individual current verification reduction factor F_i for the randomly selected neighbor node i in step S413. The current verification reduction factor F_i may be derived e.g. from the neighbor node information 342, and the current verification reduction factor F_i is a parameter (or data) being indicative of a factor of allowed reduction for the particular neighbor node i.

Exemplarily, this means that a node-individual current verification reduction factor F_i of 50% (or F_i=0.5) indicates that at least 50% of all messages received from the neighbor node i shall be verified, but also that up to 50% of all messages received from the neighbor node i do not need to be verified, and a node-individual current verification reduction factor F_i of 80% (or F_i=0.8) indicates that at least 80% of all messages received from the neighbor node i shall be verified, but also that up to 20% of all messages received from the neighbor node i do not need to be verified.

In step S414, it is checked for the randomly selected neighbor node i whether the node-individual verification rate V_i of the randomly selected neighbor node i is larger than the product of the node-individual current verification reduction factor F_i and the node-individual receiving rate R_i for the randomly selected neighbor node i. If step S414 returns NO, this means that the verification rate V_i of the randomly selected neighbor node i cannot be reduced (or cannot be further reduced), and the process returns to step S409 to obtain another random number i (and in some further embodiments, the node i for which step S414 returns NO may be scheduled or flagged for increase of the node-individual verification rate V_i).

If step S414 returns YES, which indicates that the verification rate V_i of the randomly selected neighbor node i can be reduced (or can be further reduced), the process continues with step S415 to check whether the difference between that the verification rate V_i of the randomly selected neighbor node i and the product of the node-individual current verification reduction factor F_i and the node-individual receiving rate R_i for the randomly selected neighbor node i is larger or equal to the required reduction amount of the overall verification rate V_all, i.e. the difference between the determined overall verification rate V_all and the overall verification rate threshold L.

If step S415 returns YES, the verification rate V_i of the randomly selected neighbor node i is reduced, at step S417, by the required amount corresponding to the difference between the determined overall verification rate V_all and the overall verification rate threshold L (so that the overall verification rate V_all is controlled to be lowered down to the value of the overall verification rate threshold L). In further embodiments, it is possible to reduce the overall verification rate V_all lower than the overall verification rate threshold L, however, reducing the verification rate V_i just by the required amount V_all−L is optimized for security in that the verification rate is only reduced by the required amount but still kept as large as possible to at the same time keep the overall verification rate from exceeding the threshold.

On the other hand, if step S415 returns NO, the verification rate V_i of the randomly selected neighbor node i is reduced, at step S416, only by the allowed amount corresponding to the difference between current verification rate V_i and the product of the node-individual current verification reduction factor F_i and the node-individual receiving rate R_i for the randomly selected neighbor node i, i.e. the verification rate V_i is reduced down to the allowed value of the product of the node-individual current verification reduction factor F_i and the node-individual receiving rate R_i for the randomly selected neighbor node i.

Then, in the step S418, the neighbor node information is updated, e.g. including updating of the values of the node-individual verification rate V_i of the randomly selected neighbor node i and optionally further including the updated overall verification rate V_all. Then the process goes to step S407 again, and either ends or goes to another node for further verification reduction control until the loop gives the return NO in step S407.

For example, the parameters V_i and V_all may be updated directly or, for example, by following an exponential moving averaging approach e.g. with appropriate weight factors set in the system.

In some embodiments, if all neighbor nodes have been processed according to steps S410 to S418 but step S407 still returns YES, then the remaining required reduction amount may be achieved e.g. by the following exemplary aspect: if the current number of neighbor nodes is #NN then the node-individual verification rate V_i for each of the neighbor nodes may be reduced by an amount such as (L−V_all)/#NN so as to dynamically control the overall verification rate V_all to not exceed the overall verification rate threshold L.

Or the remaining required reduction amount may be achieved by the exemplary aspect: In some embodiments, if the current number of neighbor nodes, which have not been adjusted by steps S417 or S416, is #NN1 then the node-individual verification rate V_i for each of these neighbor nodes may be reduced by an amount such as (L−V_all)/#NN1 so as to dynamically control the overall verification rate V_all to not exceed the overall verification rate threshold L.

In previous embodiments, the node-individual verification rate V_i of the randomly selected neighbor node i has been potentially reduced in accordance with a node-individual reduction factor F_i.

In some embodiments, the node-individual reduction factor F_i may be dynamically controlled so as to be allowed to change over time e.g. based on behavior of the node and/or based on earlier verification results for messages for that node. However, in some embodiments the node-individual reduction factor F_i may also be increased again over time e.g. based on behavior of the node and/or based on earlier verification results for messages for that node, so that there may occur situations in which the previously reduced verification rate V_i may need to be adjusted again for some nodes.

Figure 5:
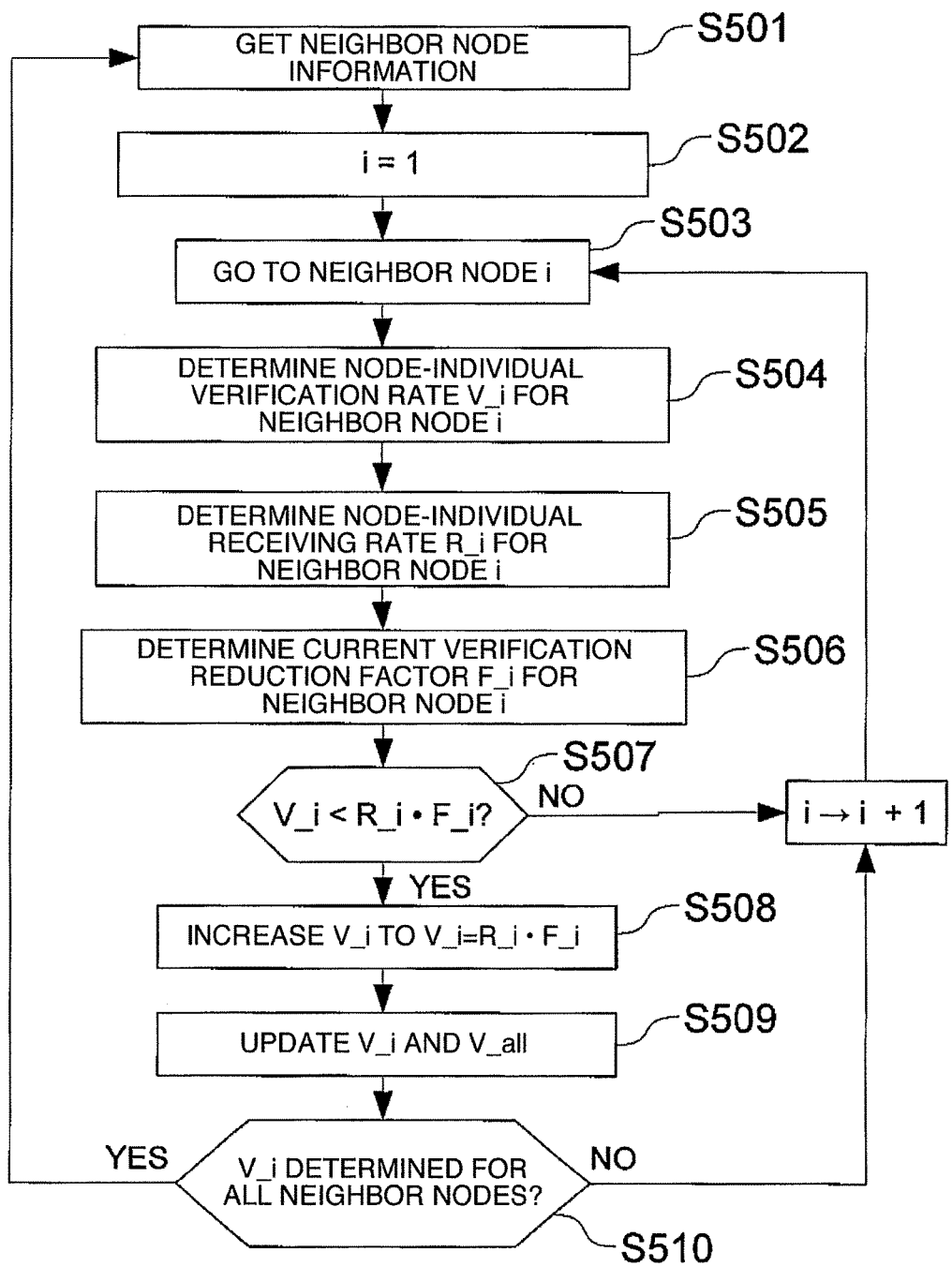
FIG. 5 exemplarily illustrates a flow chart of another exemplary verification rate control sub-process according to some exemplary embodiments.

FIG. 5 exemplarily illustrates a flow chart of another exemplary verification rate control sub-process according to some exemplary embodiments.

In step S501, the process retrieves neighbor node information (which may indicate the current neighbor nodes and/or additional information on the current neighbor nodes). Then, the process goes sequentially (or in other embodiments also asequentially) though the neighbor nodes, starting with i=1 in step S502 and going to neighbor node i in step S503, the process continues with steps S504, S505 and S506 to determine the node-individual verification rate V_i, the node-individual receiving rate R_i and the node-individual verification rate reduction factor F_i for the selected neighbor node i (e.g. similar to steps S411 to S413 above).

In step S507, it is checked for the selected neighbor node i whether the node-individual verification rate V_i of the randomly selected neighbor node i is smaller than the product of the node-individual current verification reduction factor F_i and the node-individual receiving rate R_i for the selected neighbor node i. If step S507 returns NO, this means that the verification rate V_i of the selected neighbor node i does not need to be increased, and the process returns to step S503 to go to the next neighbor node i+1.

On the other hand, if step S507 returns YES, this means that the verification rate V_i of the selected neighbor node i needs to be increased, and the process continues with step S508 of control increasing the verification rate V_i of the selected neighbor node i up to the minimal allowed value e.g. according to the product of the node-individual current verification reduction factor F_i and the node-individual receiving rate R_i for the selected neighbor node i (or more in some embodiments).

In addition or alternatively to the steps S507 and S508, the process may also check (e.g. when step S507 returns NO) whether the node-individual verification rate V_i is smaller than the node-individual receiving rate R_i for the selected neighbor node i and/or whether the overall verification rate is below or above the threshold (or a second threshold), and to increasing the verification rate V_i of the selected neighbor node i up so that the overall verification rate is controlled towards a target value (e.g. towards a threshold).

In step S509, the neighbor node information is updated, e.g. including updating of the values of the node-individual verification rate V_i of the selected neighbor node i and optionally further including the updated overall verification rate V_all.

Then, the process goes to step S510 of checking whether steps S503 and following have been performed for all current neighbor nodes, and either goes to another node (next i+1 in step S503) for further verification control until the loop gives the return YES in step S510, or it ends or goes, in some embodiments, back to step S501 (e.g. repeatedly, regularly or even periodically).

In some embodiments, the node-individual verification rate reduction factor F_i for a selected neighbor node i may preferably be controlled on the previous verification results of messages of the particular neighbor node. For example, if the previous verifications for messages of the particular neighbor node i have been successful (i.e. message verified as valid), then the node-individual verification rate reduction factor F_i may be decreased in some embodiments, and/or it may be increased when one or more of the previous verifications for messages of the particular neighbor node i have failed (i.e. messages not successfully verified or determined to be invalid etc.).

Figure 6:
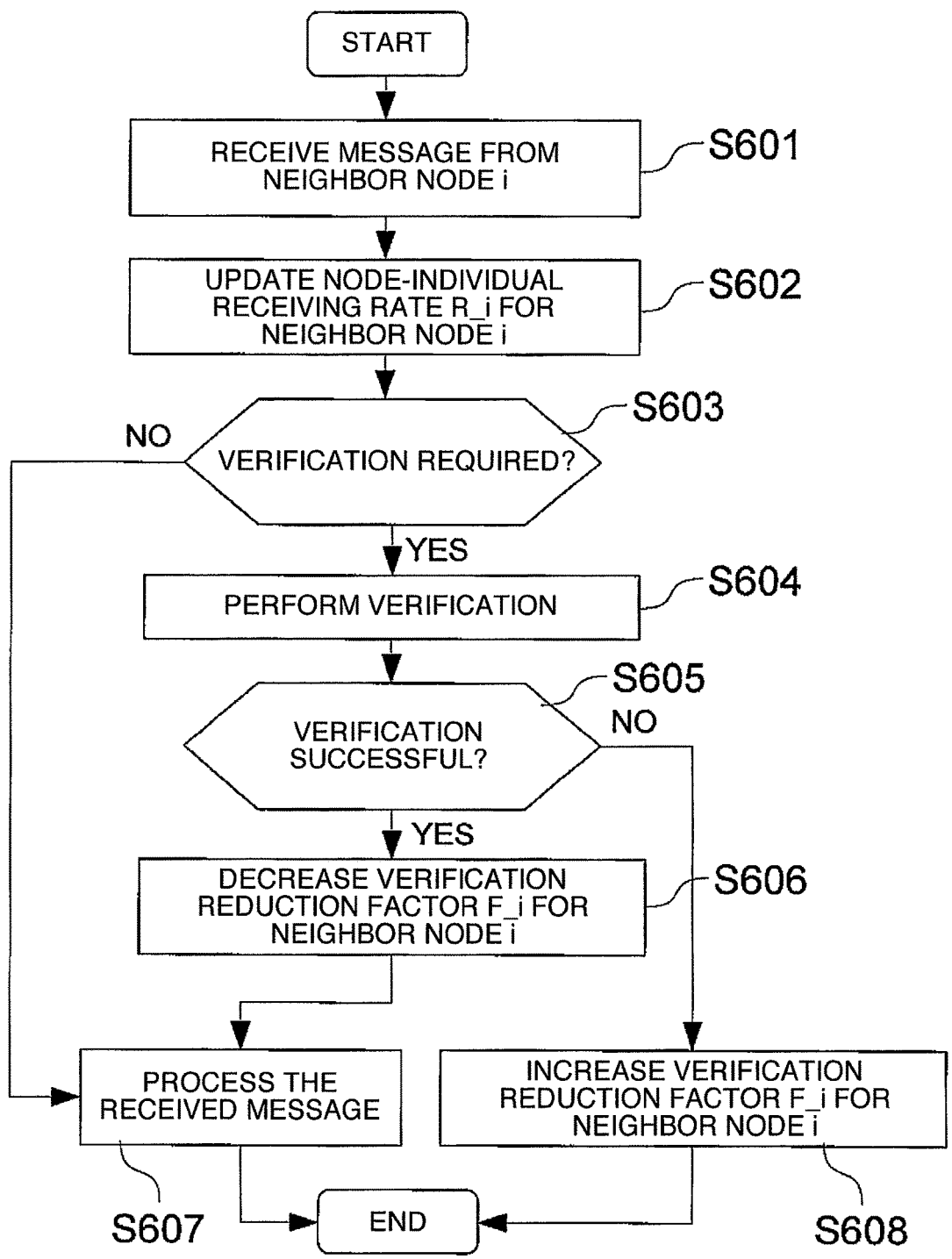
FIG. 6 exemplarily illustrates a flow chart of an exemplary message verification control process according to some exemplary embodiments.

For example, FIG. 6 exemplarily illustrates a flow chart of an exemplary message verification control process according to some exemplary embodiments.

In step S601, it is assumed that a message is received from the neighbor node i. In step S602, the node-individual receiving rate R_i for the neighbor node i is updated based on the newly received message of step S601.

In the step S603, it is determined whether verification is required or not, and if step S603 returns NO, the process continues with step S607 of processing the message (e.g. processing the message e.g. including encoding the message or message header, or e.g. by transferring the message from the verification layer to an upper processing layer).

For example, in step S603, the determination whether verification is required or not may be determined e.g. based on the verification reduction factor F_i associated with the neighbor node i.

For example, if the ratio between messages, for which a verification operation has been performed, to the totally received messages of a pre-determined earlier time period or time interval and/or of a pre-determined number of received messages is larger than the verification reduction factor F_i, then the next message does not need to be verified and the step S603 returns NO. Also, the step S605 may be executed on the basis of a time-to-verify (next-verification time) based on the verification reduction factor F_i, as e.g. explained below for some exemplary embodiments.

On the other hand, if step S603 returns YES, the process continues with step S604 and the received message is verified (i.e. a verification operation is performed on the message).

In step S605, it is determined whether the verification has been successful (i.e. whether the message has been verified to be valid or not), and if step S605 returns NO (i.e. the verification process has failed for the message), the message is discarded. However, before the process ends (or waits until the next message is received), the result NO from step S605 causes the process to control to increase the verification reduction factor F_i associated with the neighbor node i (to indicate that more up to even all of the future messages from neighbor node i need to be verified) in step S608.

On the other hand, if step S605 returns YES, the process continues decreasing the verification reduction factor F_i associated with the neighbor node i (to indicate that even less of the future messages from neighbor node i need to be verified) in step S606. Then, the message is processed in step S607.

Accordingly, depending on the earlier results of verification of messages from the neighbor node i, the node is associated with an increased verification reduction factor F_i if one or more verifications fail (maybe up to F_i=1 indicating that all messages need to be verified), and with a decreased verification reduction factor F_i if one or more verifications succeed.

Figure 7A:
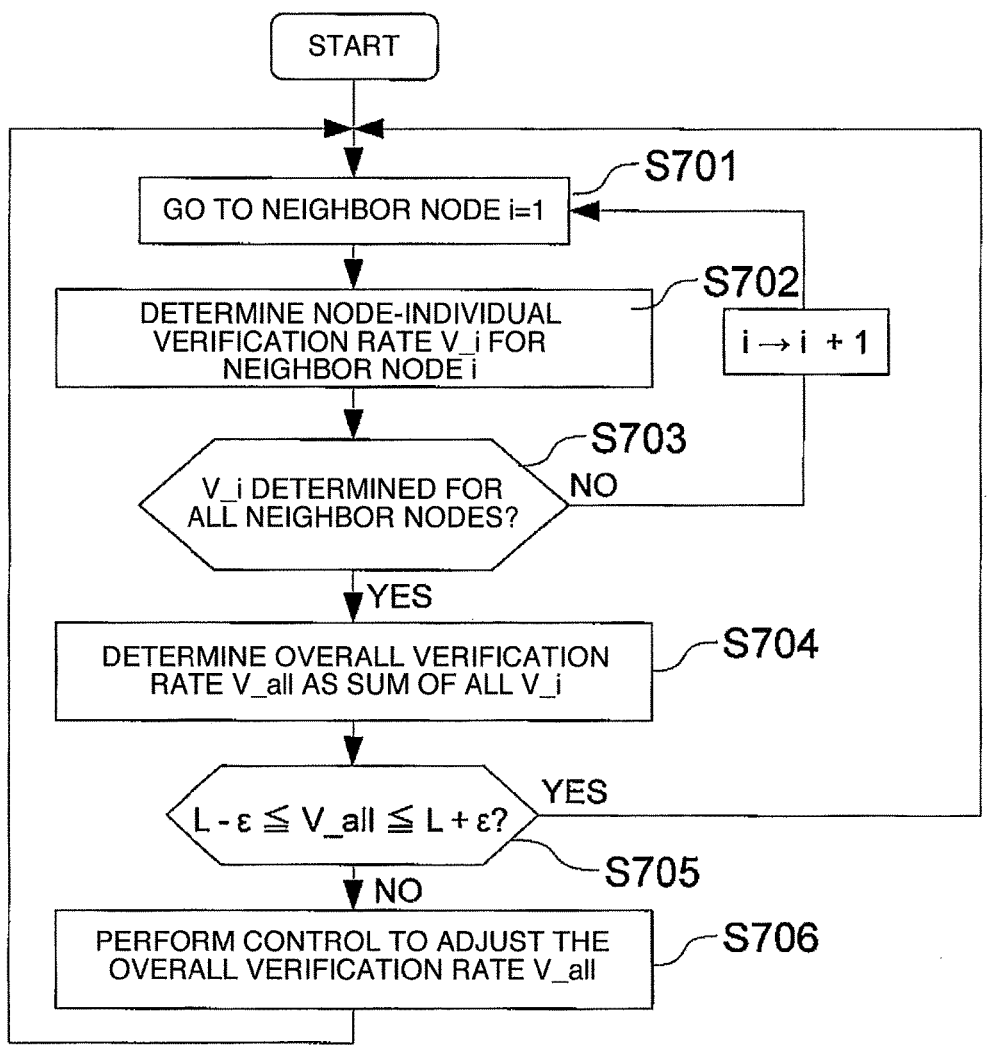
FIG. 7A exemplarily illustrates a flow chart of another exemplarily verification rate control process according to some exemplary embodiments.

FIG. 7A exemplarily illustrates a flow chart of another exemplary verification rate control process according to some exemplary embodiments.

In step S701, the process as performed at a node unit at a certain node, for example, continues with the next neighbor node i among the current neighbor nodes of the certain node.

This may for example be performed on neighbor node information (e.g. included in neighbor node information 342a) indicating the current neighbors such as e.g. a current neighbor list or current neighbor table. Such neighbor node information may, of course, dynamically change, as neighbor nodes may leave the communication range of the certain node, and as further nodes may become new neighbor nodes be entering the communication range of the certain node.

In step S702, the process (e.g. performed by processing unit 331 above) determines a node-individual verification rate V_i for the neighbor node i which is indicative of the number of verification operations performed for messages received from the neighbor node i per unit time. Again, the node-individual verification rate V_i for the neighbor node i indicates a direct or indirect measure for the processing burden involved in verification processes of messages received from the neighbor node i, i.e. the higher the node-individual verification rate V_i, the higher the processing burden involved in verification processes of messages received from the neighbor node i.

In the step S703, it is determined whether the respective node-individual verification rate V_i has been determined for all current neighbor nodes, and if step S703 returns NO, the process goes to the next neighbor node i+1 to repeat step S702 for the next neighbor node i+1, until step S703 returns YES, i.e. when the respective node-individual verification rate V_i has been determined for all current neighbor nodes.

It is to be noted again, that the above may be realized in some exemplary embodiments in that the process goes through a list of current neighbors to calculate the current node-individual verification rate V_i for all neighbor nodes of the list, or it may be realized in some other exemplary embodiments in that the current node-individual verification rate V_i is stored for all current neighbor nodes in neighbor node information (and e.g. continuously or periodically updated) and the above process exemplarily refers to the pre-stored (updated) node-individual verification rates V_i for the current neighbor nodes (e.g. in one or more steps).

On the basis of the node-individual verification rates V_i for the current neighbor nodes determined in step(s) S702, the process continues with step S704 to determine the current overall verification rate V_all, in particular exemplarily as the sum of the determined node-individual verification rates V_i for the current neighbor nodes.

The overall verification rate V_all indicates a direct or indirect measure for the processing burden involved in verification processes of all messages received from all of the neighbor nodes, i.e. the higher the overall verification rate V_all—the higher the processing burden involved in verification processes of all messages received from all of the neighbor nodes.

In step S705, the determined overall verification rate V_all is checked against a threshold value L from above and from below according to a pre-determined tolerance value parameter ε (or different upper and lower tolerance parameters ε1 and ε2 in some other exemplary embodiments), e.g. by checking whether the determined overall verification rate V_all is smaller than the threshold value L+ε or L+ε1 (overall verification rate threshold) and by whether the determined overall verification rate V_all is larger than the (second) threshold value L−ε (or L−ε2). This means, it is checked whether the determined overall verification rate V_all lies inside a
target interval between the (second/lower) threshold value L−ε (or L−ε2) and the (upper) threshold value L+ε or L+ε1 (overall verification rate threshold).

The process is intended to control the overall verification rate V_all based on the control target value L within the tolerance interval. The tolerance interval may be useful to avoid that unnecessary verification rate adjustments are performed due to minor variations and minor fluctuations around the target value L.

If step S705 returns YES, i.e. if the determined overall verification rate V_all is smaller/does not exceed the upper threshold L+ε (or L+ε1) and does not fall below the (second) lower threshold L−ε (or L−ε2), the process repeats (e.g. repeatedly, regularly, or even periodically).

On the other hand, if it is determined in step S705 that the determined overall verification rate V_all is outside the target interval and step S705 returns NO, the method continues with the step of performing control of the overall verification rate V_all, in particular to control a reduction or increase of the overall verification rate V_all according to the target interval. In some embodiments, after step S706, the process repeats (e.g. repeatedly, regularly, or even periodically).

Figure 7B:
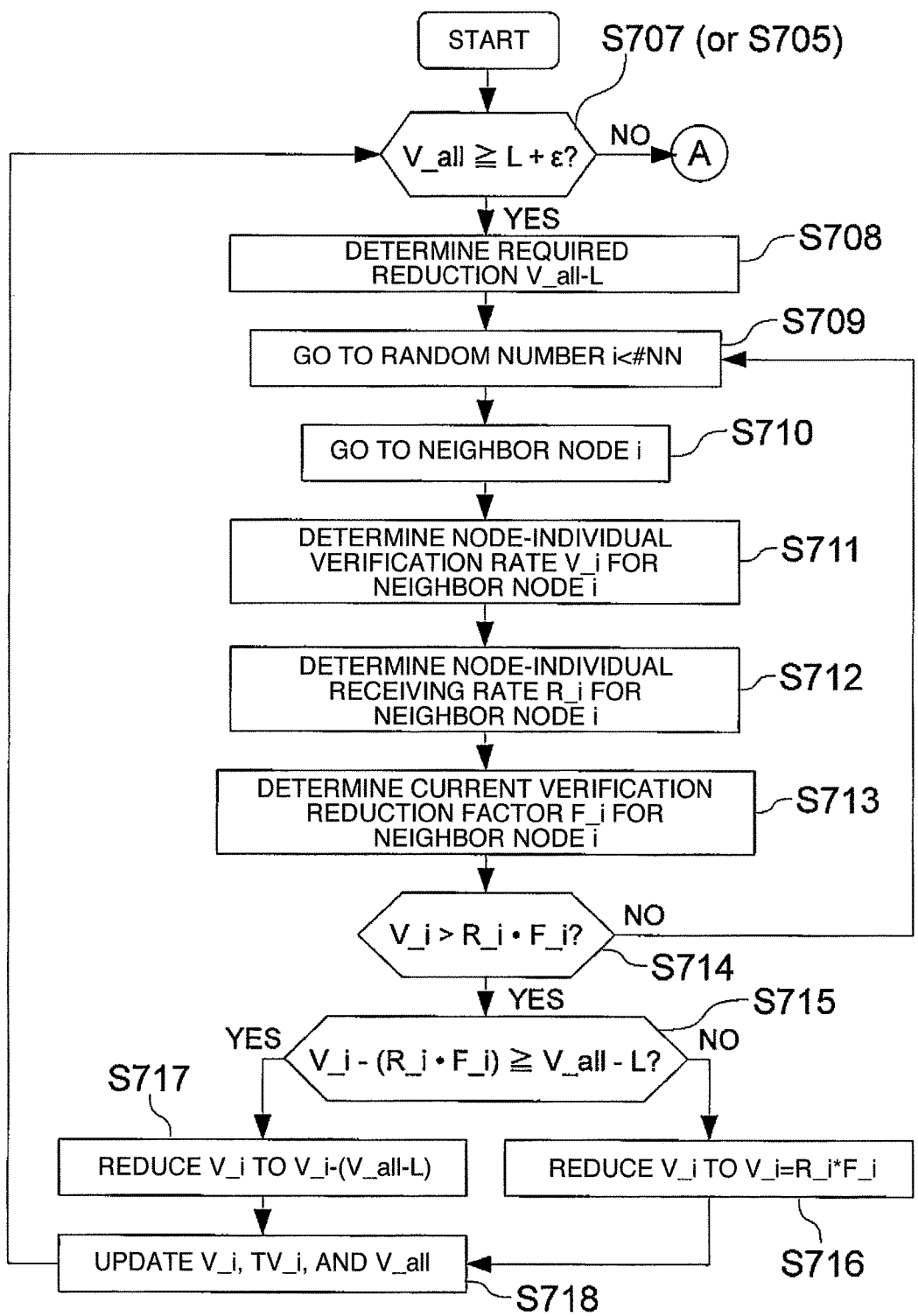
FIG. 7B exemplarily illustrates a flow chart of another exemplary verification rate control sub-process according to some exemplary embodiments.
Figure 7C:
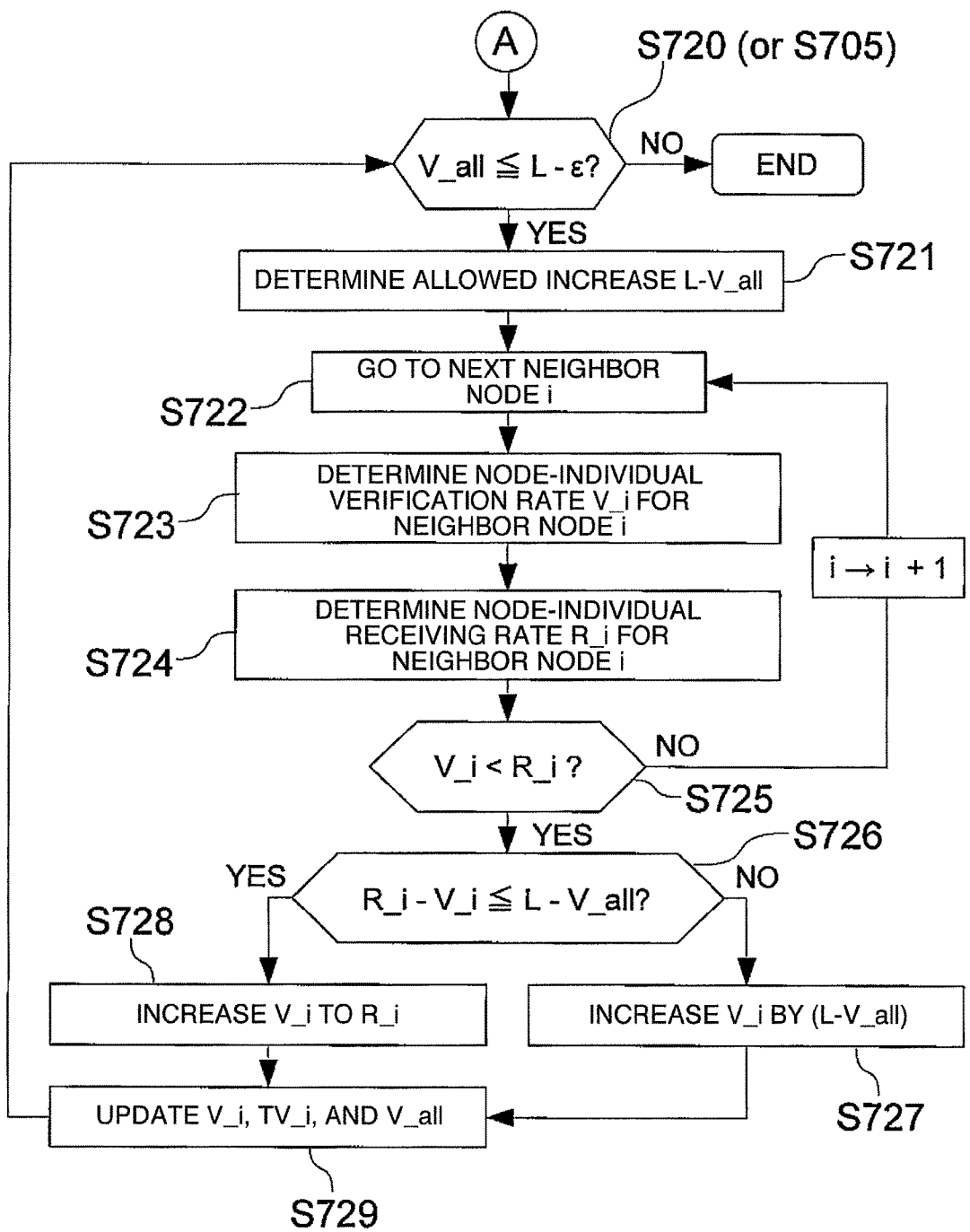
FIG. 7C exemplarily illustrates a flow chart of another exemplary verification rate control sub-process according to some exemplary embodiments.

FIGS. 7B and 7C exemplarily illustrates a flow chart of another exemplary verification rate control sub-process according to some exemplary embodiments, in particular for selecting nodes for which the node-individual verification rate V_i can be reduced to reduce the overall verification rate V_all and/or for selecting nodes for which the node-individual verification rate V_i can be enhanced to increase the overall verification rate V_all.

In step S707 (which may be performed already as step S705 above, or be performed again), the determined overall verification rate V_all is checked against the (upper) threshold value L+ε (or L+ε1), e.g. by checking whether the determined overall verification rate V_all is larger than the threshold value L+ε (overall verification rate threshold). If step S707/S705 returns NO, the sub-process of FIG. 7B goes to (A) of FIG. 7C (or ends or is started again with step S706 being repeated, and/or is independently started again repeatedly, regularly or even periodically).

If step S707 returns YES, the method continues with the sub-process, e.g. as part of or representing the control of step S706 or as an independent process, with step S708 in which the required reduction of the is determined overall verification rate V_all (which may be determined again as shown in FIG. 7A or be taken from updated neighbor node information) is calculated e.g. based on the difference between the determined overall verification rate V_all and the overall verification rate target value L, exemplarily as required reduction amount which is equal to V_all−L.

Then, for going to reduce the node-individual verification rate V_i for one of the neighbor nodes, a neighbor node needs to be selected. Again as explained for step S409, also in step S709, a random number i is exemplarily selected among the numbers 1 to #NN (being the number of current neighbor nodes). Of course, other randomization processes such as a shuffle operation of a neighbor list or the like may be performed.

Based on the random number i of the step S709, the process continues with the thus randomly selected neighbor node i (step S710) to determine the node-individual verification rate V_i of the randomly selected neighbor node i in step S711.

Exemplarily, the process also determines the node-individual receiving rate R_i for the randomly selected neighbor node i in step S712 and the node-individual current verification reduction factor F_i for the randomly selected neighbor node i in step S713. The current verification reduction factor F_i may be derived e.g. from the neighbor node information 342, and the current verification reduction factor F_i is a parameter (or data) being indicative of a factor of allowed reduction for the particular neighbor node i.

In step S714, it is checked for the randomly selected neighbor node i whether the node-individual verification rate V_i of the randomly selected neighbor node i is larger than the product of the node-individual current verification reduction factor F_i and the node-individual receiving rate R_i for the randomly selected neighbor node i. If step S714 returns NO, this means that the verification rate V_i of the randomly selected neighbor node i cannot be reduced (or cannot be further reduced), and the process returns to step S709 to obtain another random number i (and in some further embodiments, the node i for which step S714 returns NO may be scheduled or flagged for increase of the node-individual verification rate V_i).

If step S714 returns YES, which indicates that the verification rate V_i of the randomly selected neighbor node i can be reduced (or can be further reduced), the process continues with step S715 to check whether the difference between that the verification rate V_i of the randomly selected neighbor node i and the product of the node-individual current verification reduction factor F_i and the node-individual receiving rate R_i for the randomly selected neighbor node i is larger or equal to the required reduction amount of the overall verification rate V_all, i.e. the difference between the determined overall verification rate V_all and the overall verification rate target value L.

If step S715 returns YES, the verification rate V_i of the randomly selected neighbor node i is reduced, at step S717, by the required amount corresponding to the difference between the determined overall verification rate V_all and the overall verification rate target value L (so that the overall verification rate V_all is controlled to be lowered down to the value of the overall verification rate target value L).

On the other hand, if step S715 returns NO, the verification rate V_i of the randomly selected neighbor node i is reduced, at step S716, only by the allowed amount corresponding to the difference between current verification rate V_i and the product of the node-individual current verification reduction factor F_i and the node-individual receiving rate R_i for the randomly selected neighbor node i, i.e. the verification rate V_i is reduced down to the allowed value of the product of the node-individual current verification reduction factor F_i and the node-individual receiving rate R_i for the randomly selected neighbor node i.

Then, in the step S718, the neighbor node information is updated, e.g. including updating of the values of the node-individual verification rate V_i of the randomly selected neighbor node i and optionally further including the updated overall verification rate V_all. Exemplarily, step S718 may further update a time-to-verify or next-verification time TV_i associated with the neighbor node i (explained for some exemplary embodiments below). Then the process goes to step S707 again, and either goes to (A) of FIG. 7C or goes to another node for further verification reduction control until the loop gives the return NO ins step S707.

In some embodiments, if all neighbor nodes have been processed according to steps S710 to S718 but step S707 still returns YES, then the remaining required reduction amount may be achieved e.g. by the following exemplary aspect: if the current number of neighbor nodes is #NN then the node-individual verification rate V_i for each of the neighbor nodes may be reduced by an amount such as (L−V_all)/#NN so as to dynamically control the overall verification rate V_all to not exceed the overall verification rate threshold L.

Or the remaining required reduction amount may be achieved by the exemplary aspect: In some embodiments, if the current number of neighbor nodes, which have not been adjusted by steps S717 or S716, is #NN1 then the node-individual verification rate V_i for each of these neighbor nodes may be reduced by an amount such as (L−V_all)/#NN1 so as to dynamically control the overall verification rate V_all to not exceed the overall verification rate threshold L.

However, as mentioned above, if step S707 returns NO, the method goes to (A) in FIG. 7C and continues with step S720 (which may be performed already as step S705 above, or be performed again) in which the determined overall verification rate V_all is checked against the (lower) second threshold value L−ε (or L−ε1), e.g. by checking whether the determined overall verification rate V_all is smaller than the (lower) second threshold value L−ε. If step S720/S705 returns NO, the sub-process of FIG. 7C ends (or is started again with step S706 being repeated, and/or is independently started again repeatedly, regularly or even periodically).

If step S720 returns YES, the method continues with the sub-process, e.g. as part of or representing the control of step S706 or as an independent process, with step S721 in which the allowed increase amount of the determined overall verification rate V_all (which may be determined again as shown in FIG. 7A or be taken from updated neighbor node information) is calculated e.g. based on the difference between the determined overall verification rate V_all and the overall verification rate target value L, exemplarily as allowed increase amount which is equal to L−V all.

Then, for going to increase the node-individual verification rate V_i for one of the neighbor nodes, a neighbor node needs to be selected, e.g. by going to the next neighbor node i (step S722). The process continues with the selected neighbor node i to determine the node-individual verification rate V_i of the randomly selected neighbor node i in step S723. Exemplarily, the process also determines the node-individual receiving rate R_i for the randomly selected neighbor node i in step S724.

In step S725, it is checked for the selected neighbor node i whether the node-individual verification rate V_i of the randomly selected neighbor node i is smaller than the node-individual receiving rate R_i for the selected neighbor node i. If step S725 returns NO, this means that the verification rate V_i of the selected neighbor node i cannot be increased (or cannot be further increased), and the process returns to step S722 to go to the next node i+1.

If step S725 returns YES, which indicates that the verification rate V_i of the selected neighbor node i can be increased (or can be further increased), the process continues with step S726 to check whether the difference between that the node-individual receiving rate R_i for the selected neighbor node i and the verification rate V_i of the selected neighbor node i is smaller or equal to the allowed increase amount of the overall verification rate V_all, i.e. the difference between the overall verification rate target value L and the determined overall verification rate V all.

If step S726 returns NO, the verification rate V_i of the selected neighbor node i is increased, at step S727, by the overall allowed amount corresponding to the difference between the between the overall verification rate target value L and the determined overall verification rate V_all (so that the overall verification rate V_all is controlled to be increased up to the value of the overall verification rate target value L).

On the other hand, if step S726 returns YES, the verification rate V_i of the selected neighbor node i is increased, at step S728, only by the node-individual possible amount corresponding to an increase up to the node-individual receiving rate R_i for the selected neighbor node i (i.e. all messages from node i being verified).

Then, in the step S727, the neighbor node information is updated, e.g. including updating of the values of the node-individual verification rate V_i of the selected neighbor node i and optionally further including the updated overall verification rate V_all. Exemplarily, step S727 may further update a time-to-verify or next-verification time TV_i associated with the neighbor node i (explained for some exemplary embodiments below). Then the process goes to step S720 again, and either ends or goes to another node for further verification reduction control until the loop gives the return NO ins step S720 (or all neighbor nodes have the verification rate V_i being equal to the receiving rate R_i).

Figure 8:
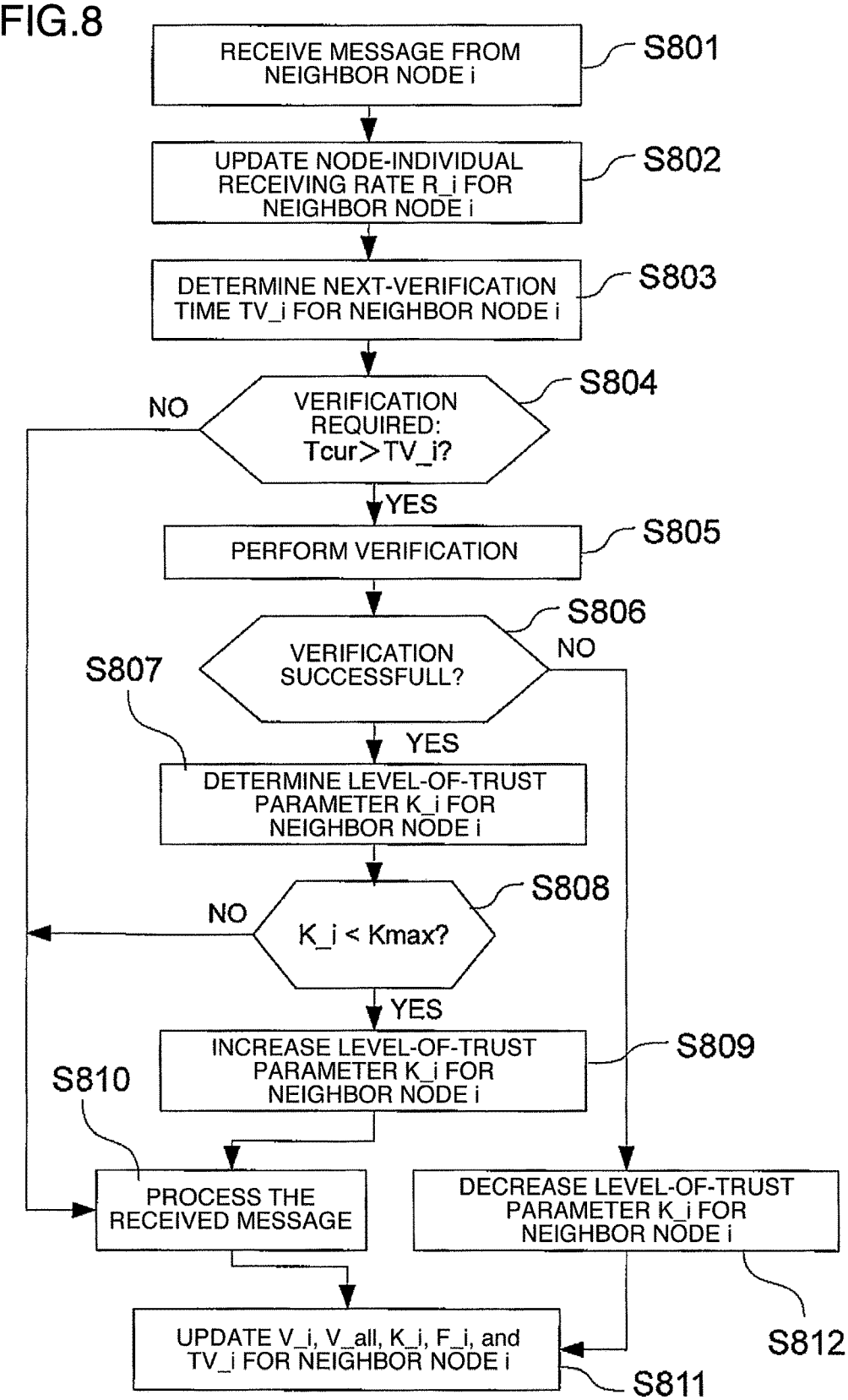
FIG. 8 exemplarily illustrates a flow chart of another exemplary message verification control process according to some exemplary embodiments.

FIG. 8 exemplarily illustrates a flow chart of another exemplary message verification control process according to some exemplary embodiments.

In step S801 it is assumed that a message is received from the neighbor node i. In step S802, the node-individual receiving rate R_i for the neighbor node i is updated based on the newly received message of step S801.

In the step S803, the process determines a node-individual next-verification time TV_i (time-to-verify) associated with the neighbor node i based on neighbor node information (or based on a calculation from a verification reduction factor F_i or level-of-trust parameter K_i associated with the neighbor node i).

For the determination of step S804 whether verification of the received message is required or not, the determined next-verification time TV_i associated with the neighbor node i is compared with a current time Tcur, and, if Tcur is later than the determined next-verification time TV_i, the verification is needed and step S804 returns YES but, if Tcur is earlier than the determined next-verification time TV/_i, the verification is not needed and step S804 returns NO.

That is, in the step S804, it is determined whether verification is required or not, and if step S804 returns NO, the process continues with step S810 of processing the message (e.g. processing the message e.g. including encoding the message or message header, or e.g. by transferring the message from the verification layer to an upper processing layer).

On the other hand, if step S804 returns YES, the process continues with step S805 and the received message is verified (i.e. a verification operation is performed on the message).

In step S806, it is determined whether the verification has been successful (i.e. whether the message has been verified to be valid or not), and if step S806 returns NO (i.e. the verification process has failed for the message), the message is discarded. However, before the process ends (or waits until the next message is received), the result NO from step S806 causes the process to control to indirectly increase the verification reduction factor F_i associated with the neighbor node i (to indicate that more up to even all of the future messages from neighbor node i need to be verified) by decreasing a level-of-trust parameter K_i associated with the neighbor node i in step S812.

On the other hand, if step S806 returns YES, the process continues with determining the level-of-trust parameter K_i associated with the neighbor node i in step S807 and checking whether the level-of-trust parameter K_i is below a maximal level-of-trust parameter Kmax (K_i<Kmax?) in step S808, and if step S808 returns NO, the message is processed in step S810. However, if the level-of-trust parameter K_i is below a maximal level-of-trust parameter Kmax, and step S808 returns YES, the method continues with indirectly decreasing the verification reduction factor F_i associated with the neighbor node i (to indicate that even less of the future messages from neighbor node i need to be verified) by increasing a level-of-trust parameter K_i associated with the neighbor node i in step S809. Then, the message is processed in step S810.

Accordingly, depending on the earlier results of verification of messages from the neighbor node i, the node is associated with an increased verification reduction factor F_i by a reduced level-of-trust parameter K_i if one or more verifications fail (maybe up to F_i=1 indicating that all messages need to be verified), and with a decreased verification reduction factor F_i by an increased level-of-trust parameter K_i if one or more verifications succeed. That is, the respective level-of-trust parameters may indicate a trustworthiness of the respective associated node which is determined on the basis of previous verification results in connection with messages received from that respective associated node.

In step S811, the process updates the respective parameters in the neighbor node information 342 including updating of the node-individual verification rate parameter V_i associated with the neighbor node i (as potentially changed by S804/S805), the overall verification rate parameter V_all (e.g. affected by a changed V_i), the node-individual level-of-trust parameter K_i associated with the neighbor node i (as e.g. changed by step S812 or S809), the node-individual verification reduction factor F_i associated with the neighbor node i (as e.g. affected by a changed level-of-trust parameter K_i), and a next-verification time TV_i associated with the neighbor node i (as e.g. affected by a changed level-of-trust parameter K_i and/or the changed verification reduction factor F_i).

For example, in order to control a node-individual verification rate parameter V_i associated with the neighbor node i in the above, the intended control value of the verification rate parameter V_i can be used to update the next-verification time TV_i associated with the neighbor node i as used in step S804. For example, upon verifying a message, the next-verification time TV_i associated with the neighbor node i is updated as TV_i=Tcur+1/V_i.

Also, in the above, the level-of-trust parameter K_i (level of trustworthiness) associated with the neighbor node i increases exemplarily with decreasing verification reduction factor F_i associated with the neighbor node i and exemplarily decreases with increasing verification reduction factor F_i associated with the neighbor node i. In some embodiments, the relationship may be linear such as e.g. by F_i=1−K_i or the like.

In some preferred exemplary embodiments, the level-of-trust parameter K_i associated with the neighbor node i may be limited to an interval between 0 and a maximum value Kmax to avoid a situation in which the reduction factor F_i becomes 0, so it can be avoided that no messages from a certain node are verified. Preferably, Kmax is a number or value taken from the interval larger than 0 to smaller than 1.

Regarding increase and decrease of the level-of-trust parameter K_i associated with the neighbor node i based on verification results, it is of course possible to provide step functions in which the level-of-trust parameter K_i is increased/decreased by a step amount when one or more verifications succeed/fail.

However, in some exemplary embodiments, it is proposed that the level-of-trust parameter K_i is increased as a function of successive successfully verified messages received from the node i. For example, in some exemplary embodiments, the level-of-trust parameter K_i may be provided as $K\_i = 1 - \alpha^{n\_j}$ where a is a number or value taken from the interval larger than 0 to smaller than 1, and its exponent n_i is a total number of consecutive successful verifications of packets/messages received from the particular neighbor i.

Exemplarily, the parameter $\alpha$ defines how quickly a neighbor is to be trusted more, and, for example, for $\alpha=0.95$ the level-of-trust is quickly increased for the first successful verifications and gradually more slowly increases for later verifications (e.g. until it reaches the exemplary upper bound Kmax, e.g. Kmax is from the interval 0.85 to 0.95, preferably 0.9).

Such larger values of $\alpha=0.95$ in the range of a is 0.75 to 0.95, more preferably between 0.85 and 0.95 are more preferable especially in dynamic scenarios in which neighbors join and leave the local network quickly.

For decreasing the level-of-trust parameter K_i when a verification is not successful and fails, the above formula $K\_i = 1 - \alpha^{n\_i}$ where a is a number or value taken from the interval larger than 0 to smaller than 1, and its exponent n_i is a total number of consecutive successful verifications of packets/messages received from the particular neighbor i, may be taken (e.g. then n_i becomes 0 and K_i is determined as 0).

In other exemplary embodiments, the "punishment" may be less strict, e.g. by multiplying the previous level-of-trust parameter K_i with a punishment factor 6 from the interval of 0 to smaller than 1, that is K_i goes to 6 times K_i. The factor 6 determines the strength or strictness of punishment. A factor 6 equal to zero means that the next packet is verified in any case, and a factor of 6=0.5 means that the level-of-trust is halved for every new verification failure of the particular neighbor i.

In view of the above, some embodiments propose an advantageous control of message verification in a communication network including mobile nodes, which provides very high security but at the same time is more cost effective and requires less computational burden in message verification.

Features, components and specific details of the structures of the above-described embodiments may be exchanged or combined to form further embodiments optimized for the respective application. As far as those modifications are readily apparent for an expert skilled in the art they shall be disclosed implicitly by the above description without specifying explicitly every possible combination, for the sake of conciseness of the present description.

The invention claimed is:

1. A method for managing verification processing of communication messages in a communication system including a plurality of nodes, the method comprising:
   receiving, at a first node of the communication system, one or more communication messages from one or more neighbor nodes of the first node,
   performing validity verification operations for the one or more received communication messages,
   determining an overall verification rate parameter being indicative of a number of validity verification operations performed per unit time at the first node, and
   controlling performing validity verification operations for one or more further communication messages received at the first node from neighbor nodes of the first node on the basis of a requirement that the determined overall verification rate parameter remains below an overall verification rate threshold,
   receiving, at the first node, one or more first communication messages from a second node among neighbor nodes of the first node,
   performing a validity verification operation for the one or more received first communication messages, and
   receiving, at the first node, one or more second communication messages from the second node,
   wherein controlling performing validity verification operations for one or more further communication messages includes reducing one or more node-individual verification rates when it is determined that the determined overall verification rate parameter exceeds the overall verification rate threshold,
   wherein controlling performing validity verification operations for one or more further communication messages includes increasing one or more node-individual verification rates when it is determined that the determined overall verification rate parameter falls below a second verification rate threshold,
   wherein reducing a node-individual verification rate being associated with the second node includes deciding, upon receiving one or more second communication messages from the second node at the first node, whether to perform a validity verification operation for the one or more second communication messages on the basis of validity verification results of verification of the one or more first communication messages, and
   wherein deciding whether to perform a validity verification operation for the one or more second communication messages is performed on the basis of verification history data being associated with the second node and being indicative of successful validity verification results relating to communication messages received from the second node.

2. The method according to claim 1, wherein:
   each node-individual verification rate is respectively associated with a respective one of the neighbor nodes of the first node, a respective node-individual verification rate indicating a number of validity verification operations performed per unit time at the first node for communication messages received from the respective associated neighbor node.

3. The method according to claim 1, wherein:
   the verification history data associated with the second node includes a verification parameter being indicative of a level of trustworthiness being associated with the second node.

4. The method according to claim 3, characterized by further comprising:
   determining the verification parameter for the second node on the basis of a number of consecutive successful verifications of communication messages received from the second node.

5. The method according to claim 4, wherein:
   the verification parameter for the second node is determined to indicate an increased level of trustworthiness of the second node for an increasing number of consecutive successful verifications of communication messages received from the second node.

6. The method according to claim 4, wherein:
   the verification parameter for the second node is determined to indicate a decreased level of trustworthiness of the second node if one or more validity verification operations performed on communication messages received from the second node fail.

7. The method according to claim 3, wherein:
a verification rate reduction factor indicating a node-individual verification rate with respect to a node-individual receiving rate being associated with the second node is determined on the basis of the verification parameter associated with the second node.

8. The method according to claim 1, wherein:
reducing a node-individual verification rate being associated with the second node is performed on the basis of a maximum allowed verification rate reduction amount associated with the second node and/or on the basis of a difference between the determined overall verification rate parameter and the overall verification rate threshold.

9. The method according to claim 8, wherein:
if the maximum allowed verification rate reduction amount associated with the second node is smaller than the difference between the determined overall verification rate parameter and the overall verification rate threshold, the node-individual verification rate being associated with the second node is reduced by equal or less than the maximum allowed verification rate reduction amount associated with the second node, and
the method further comprises reducing a node-individual verification rate being associated with a third node including deciding, upon receiving one or more third communication messages from the third node at the first node, whether to perform a validity verification operation for one or more fourth communication messages on the basis of validity verification results of verification of the one or more third communication messages.

10. The method according to claim 8, wherein:
the maximum allowed verification rate reduction amount associated with the second node is determined on the basis of the determined verification rate reduction factor associated with the second node and a message receiving rate being indicative of a number of communication messages received at the first node from the second node per unit time.

11. An apparatus for managing verification processing of communication messages in a communication system including a plurality of nodes, the apparatus comprising:
a receiver configured to receive one or more communication messages from one or more neighbor nodes, and
a processing unit being configured to execute:
performing validity verification operations for the one or more received communication messages,
determining an overall verification rate parameter being indicative of a number of validity verification operations performed per unit time at the receiver,
controlling performing validity verification operations for one or more further communication messages received at the receiver from the one or more neighbor nodes on the basis of a requirement that the determined overall verification rate parameter remains below an overall verification rate threshold,
receiving, at the receiver, one or more first communication messages from a second node among neighbor nodes of the receiver,
performing a validity verification operation for the one or more received first communication messages, and
receiving, at the receiver, one or more second communication messages from the second node,
wherein controlling performing validity verification operations for one or more further communication messages includes reducing one or more node-individual verification rates when it is determined that the determined overall verification rate parameter exceeds the overall verification rate threshold,
wherein controlling performing validity verification operations for one or more further communication messages includes increasing one or more node-individual verification rates when it is determined that the determined overall verification rate parameter falls below a second verification rate threshold,
wherein reducing a node-individual verification rate being associated with the second node includes deciding, upon receiving one or more second communication messages from the second node at the receiver, whether to perform a validity verification operation for the one or more second communication messages on the basis of validity verification results of verification of the one or more first communication messages, and
wherein deciding whether to perform a validity verification operation for the one or more second communication messages is performed on the basis of verification history data being associated with the second node and being indicative of successful validity verification results relating to communication messages received from the second node.

12. One or more non-transitory computer-readable media storing instructions that, when executed by one or more processors, program the one or more processors to perform operations for managing verification processing of communication messages in a communication system including a plurality of nodes, and cause the one or more processors, when a receiver at the first node receives one or more communication messages from one or more neighbor nodes of the first node, to execute steps of a method for managing the verification processing of communication messages, the method comprising:
receiving, at a first node of the communication system, one or more communication messages from one or more neighbor nodes of the first node,
performing validity verification operations for the one or more received communication messages,
determining an overall verification rate parameter being indicative of a number of validity verification operations performed per unit time at the first node,
controlling performing validity verification operations for one or more further communication messages received at the first node from neighbor nodes of the first node on the basis of a requirement that the determined overall verification rate parameter remains below an overall verification rate threshold,
receiving, at the first node, one or more first communication messages from a second node among neighbor nodes of the first node,
performing a validity verification operation for the one or more received first communication messages, and
receiving, at the first node, one or more second communication messages from the second node,
wherein controlling performing validity verification operations for one or more further communication messages includes reducing one or more node-individual verification rates when it is determined that the determined overall verification rate parameter exceeds the overall verification rate threshold,
wherein controlling performing validity verification operations for one or more further communication messages includes increasing one or more node-individual verification rates when it is determined that the determined overall verification rate parameter falls below a second verification rate threshold, wherein reducing a node-individual verification rate being associated with the second node includes deciding, upon receiving one or more second communication messages from the second node at the first node, whether to perform a validity verification operation for the one or more second communication messages on the basis of validity verification results of verification of the one or more first communication messages, and wherein deciding whether to perform a validity verification operation for the one or more second communication messages is performed on the basis of verification history data being associated with the second node and being indicative of successful validity verification results relating to communication messages received from the second node.

* * * * *